United States Patent
Asai

(10) Patent No.: US 10,477,039 B2
(45) Date of Patent: Nov. 12, 2019

(54) NON-TRANSITORY COMPUTER-READABLE MEDIUM STORING OUTPUT INSTRUCTIONS TO CONTROL PORTABLE TERMINAL AND PORTABLE TERMINAL

(71) Applicant: BROTHER KOGYO KABUSHIKI KAISHA, Nagoya-shi, Aichi-ken (JP)

(72) Inventor: Norihiko Asai, Tajimi (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 364 days.

(21) Appl. No.: 15/165,177

(22) Filed: May 26, 2016

(65) Prior Publication Data
US 2016/0352931 A1 Dec. 1, 2016

(30) Foreign Application Priority Data
May 29, 2015 (JP) .................................. 2015-109464

(51) Int. Cl.
G06F 3/048 (2013.01)
H04N 1/00 (2006.01)
G06F 3/0484 (2013.01)

(52) U.S. Cl.
CPC ....... H04N 1/00206 (2013.01); G06F 3/0484 (2013.01); H04N 1/00307 (2013.01);
(Continued)

(58) Field of Classification Search
None
See application file for complete search history.

(56) References Cited

U.S. PATENT DOCUMENTS

| 6,232,973 B1* | 5/2001 | Dow ................. H04N 1/00127 358/473 |
| 2011/0066982 A1* | 3/2011 | Paulsami .............. G06F 3/0482 715/835 |

(Continued)

FOREIGN PATENT DOCUMENTS

| JP | 2012-203742 A | 10/2012 |
| JP | 2014-215927 A | 11/2014 |
| JP | 2015-023553 A | 2/2015 |

OTHER PUBLICATIONS

Japanese Office Action dated Nov. 20, 2018 in Japanese Patent Application No. 2015-109464.

*Primary Examiner* — Claudia Dragoescu
(74) *Attorney, Agent, or Firm* — Scully, Scott, Murphy & Presser, P.C.

(57) ABSTRACT

A portable terminal includes a user interface, a memory, a network interface, and a controller, and performs operations including: performing a first acquiring processing of acquiring a data identification information; performing a second acquiring processing of acquiring operation information representing output operations, performing a first output instructing processing of transmitting output instructing information to a output device via the network interface, the output instructing information being information for outputting a content data identified by the data identification information by a target operation; and performing, when it is determined that the operation identification information represents one output operation, a second output instructing processing of transmitting the output instructing information to the output device via the network interface, wherein the target operation of the second output instructing processing is the output operation represented by the operation information.

12 Claims, 13 Drawing Sheets

(52) U.S. Cl.
CPC . *H04N 1/00347* (2013.01); *H04N 2201/0055* (2013.01); *H04N 2201/0094* (2013.01)

(56) References Cited

U.S. PATENT DOCUMENTS

| | | | |
|---|---|---|---|
| 2011/0317211 A1* | 12/2011 | Yamada | G06F 9/50 358/1.15 |
| 2012/0243043 A1 | 9/2012 | Asai | |
| 2012/0243048 A1* | 9/2012 | Asai | G06F 3/1205 358/1.16 |
| 2013/0222618 A1* | 8/2013 | Chang | H04L 12/2805 348/207.2 |
| 2014/0320903 A1 | 10/2014 | Kyoo | |
| 2015/0029550 A1 | 1/2015 | Asai et al. | |

\* cited by examiner

FIG. 3A

| DEVICE ID | OPERATION INFORMATION |
|---|---|
| MFP-A | PRINT/FAX TRANSMISSION |

FIG. 3B

| DEVICE UPDATE FLAG | OFF |
|---|---|

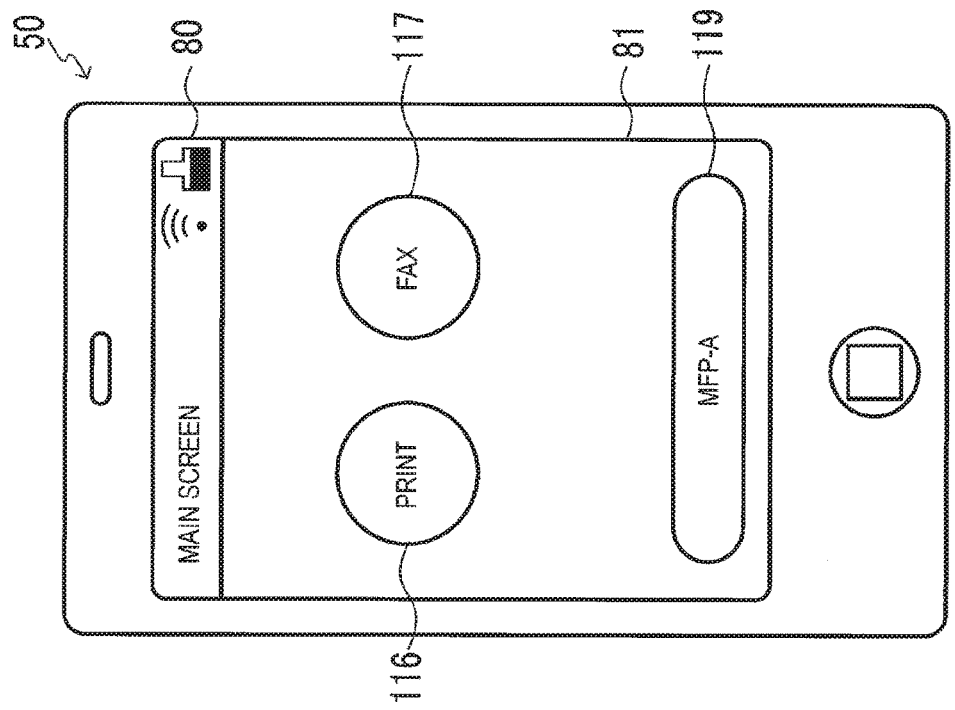
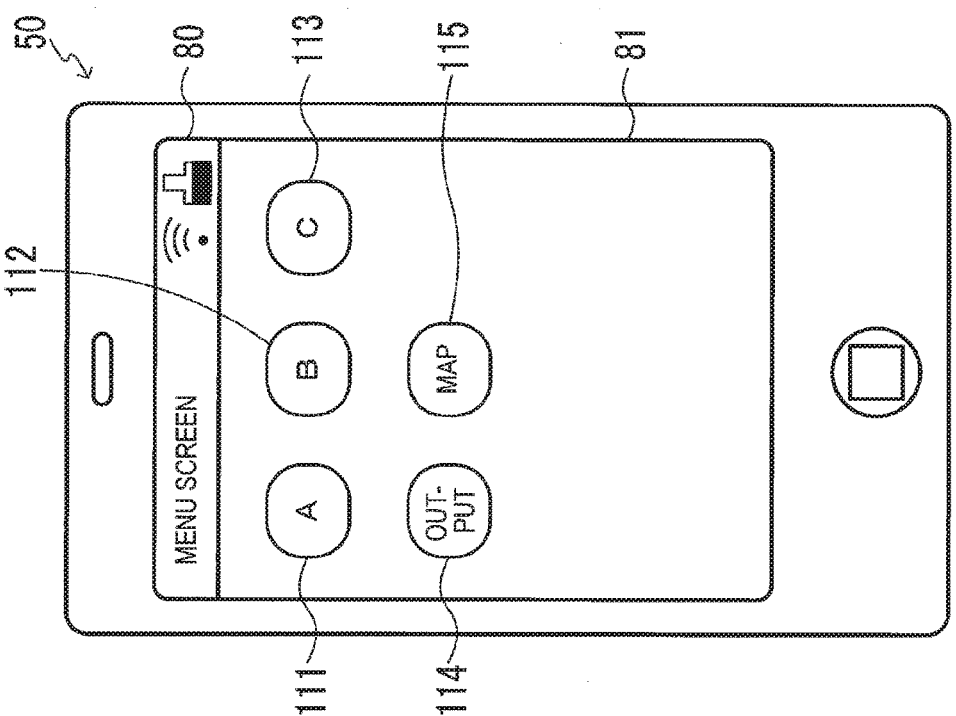

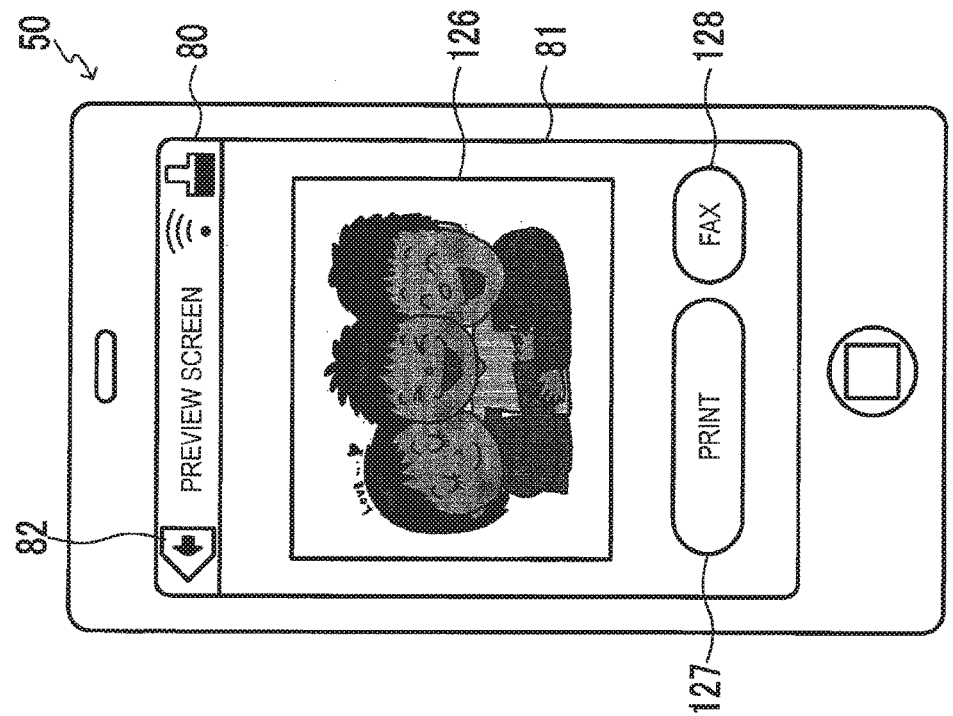
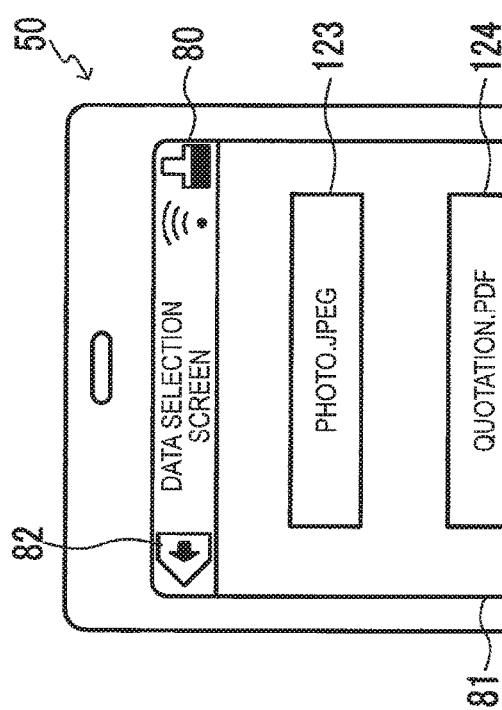
FIG. 9A
FIG. 9B

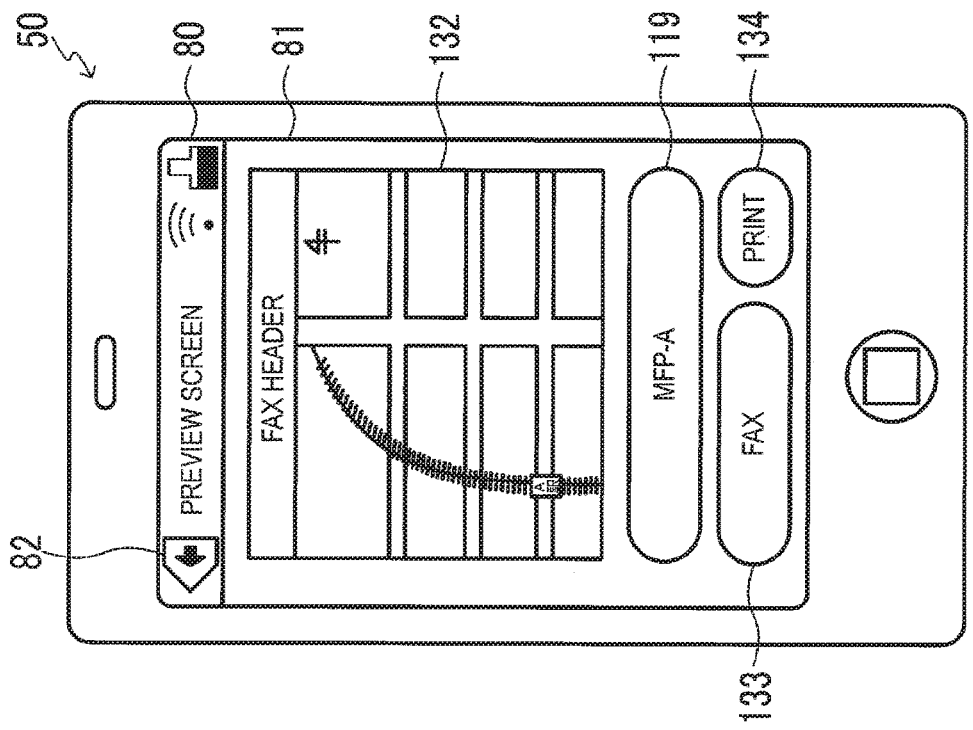
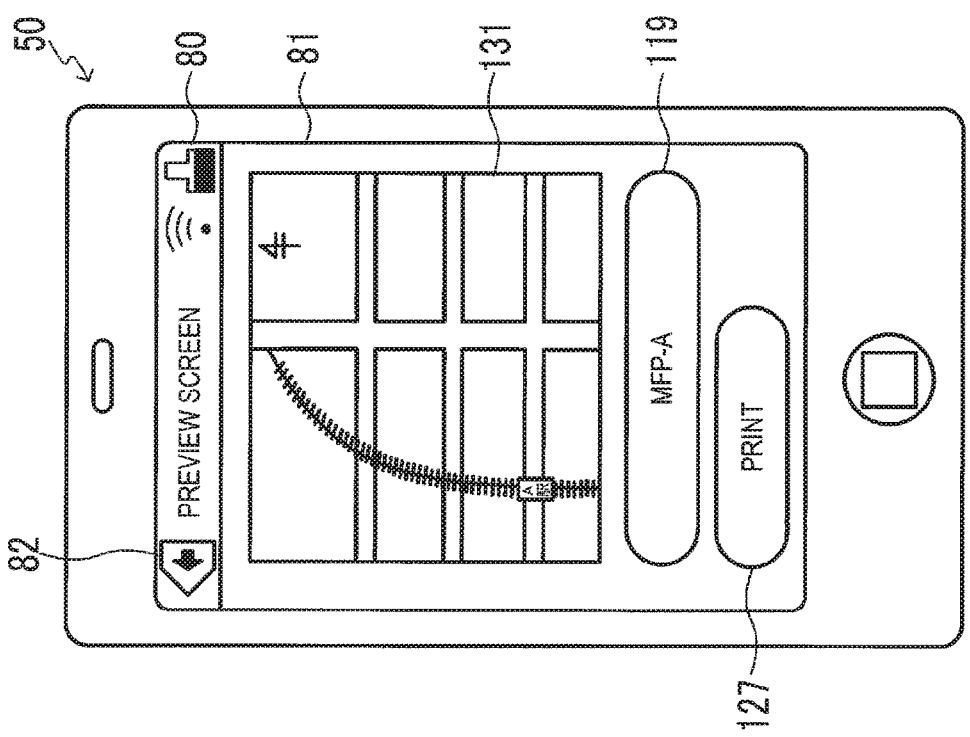

NON-TRANSITORY COMPUTER-READABLE MEDIUM STORING OUTPUT INSTRUCTIONS TO CONTROL PORTABLE TERMINAL AND PORTABLE TERMINAL

CROSS-REFERENCE TO RELATED APPLICATION

This application claims priority from Japanese Patent Application No. 2015-109464 filed on May 29, 2015, the entire subject matter of which is incorporated herein by reference.

TECHNICAL FIELD

This disclosure relates to output instructions for outputting content data and a portable terminal for executing the output instructions.

BACKGROUND

A background art discloses a printing application which causes a user to designate image data stored, and the like, in a portable terminal and causes a printer to print images represented by the designated image data. Also, a background art discloses an application which transfers image data to the printing application.

SUMMARY

Recent printers are so-called multi-function peripherals (abbreviated as MFPs) being able to perform not only a printing operation to record images on sheets but also a FAX transmitting operation to fax images. However, there is a problem that the background printing application is impossible to instruct MFPs to perform faxing operations.

This disclosure provides output instructions which can instruct an output device being able to perform a plurality of output operations to perform any one of the plurality of output operations.

In view of the above, a non-transitory computer-readable medium according to this disclosure stores output instructions to control a portable terminal including a user interface, a memory, and a network interface, the network interface being configured to be electrically connected to a plurality of output devices each of which is able to perform at least one of a plurality of output operations of outputting content data, the memory being configured to store activation source instructions that are able to cause the portable terminal to activate the output instructions and to perform a processing of notifying the output instructions of data identification information identifying the content data, the output instructions and the activation source instructions being executable by a processor. The output instructions cause the portable terminal to perform operations comprising: performing, in response to a user operation of designating one of the plurality of output devices via the user interface, a storage control processing of storing device identification information identifying the designated output device, in the memory; performing, when the output instructions are activated by the activation source instructions, a first acquiring processing of acquiring the data identification information; performing a second acquiring processing of acquiring operation information representing output operations, which is able to be performed by the output device identified by the device identification information; performing a first determining processing of determining whether the operation information represents one output operation or a plurality of output operations; performing, when it is determined in the first determining processing that the operation information represents a plurality of output operations, a first receiving processing of receiving an operation of designating a target operation which one of the plurality of output operations represented by the operation information, via the user interface; performing a first output instructing processing of transmitting output instructing information to the output device via the network interface, the output instructing information being information for outputting the content data identified by the data identification information by the target operation; and performing, when it is determined in the first determining processing that the operation identification information represents one output operation, a second output instructing processing of transmitting the output instructing information to the output device via the network interface, wherein the target operation of the second output instructing processing is the output operation represented by the operation information.

According to this disclosure, in a case where an output device is able to perform a plurality of output operations, when a user designates an output operation from among the plurality of output operations, content data is output by the designated output operation. Therefore, it is possible to make the output device perform an output operation which a user desires.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 3A and 3B show examples of information stored in a data storage area 62B, wherein FIG. 3A shows a device ID and operation information, and FIG. 3B shows a device update flag;

FIGS. 7A and 7B show display examples of a display 53, wherein FIG. 7A shows a menu screen, and FIG. 7B shows a main screen which does not include any device switching message;

FIGS. 8A and 8B show display examples of the display 53, wherein FIG. 8A shows a main screen including a device switching message, and FIG. 8B shows a device selection screen;

FIGS. 9A and 9B show display examples of the display 53, wherein FIG. 9A shows a data selection screen, and FIG. 9B shows a preview screen;

FIGS. 10A and 10B show display examples of the display 53, wherein FIG. 10A shows a map designation screen, and FIG. 10B shows a preview screen which is displayed in a case where operation information represents a plurality of output operations;

FIGS. 11A and 11B show display examples of a preview screen, wherein FIG. 11A shows a preview screen which is displayed in a case where operation information represents only one output operation, and FIG. 11B shows a preview screen which is displayed when a FAX switching icon 128 of FIG. 10A is selected;

DETAILED DESCRIPTION

Hereinafter, an embodiment of this disclosure will be described with reference to appropriate drawings. Also, it goes without saying that the embodiment to be described below is just an example of this disclosure, and the embodiment of this disclosure can be appropriately modified without changing the scope of this disclosure.

Figure 1:
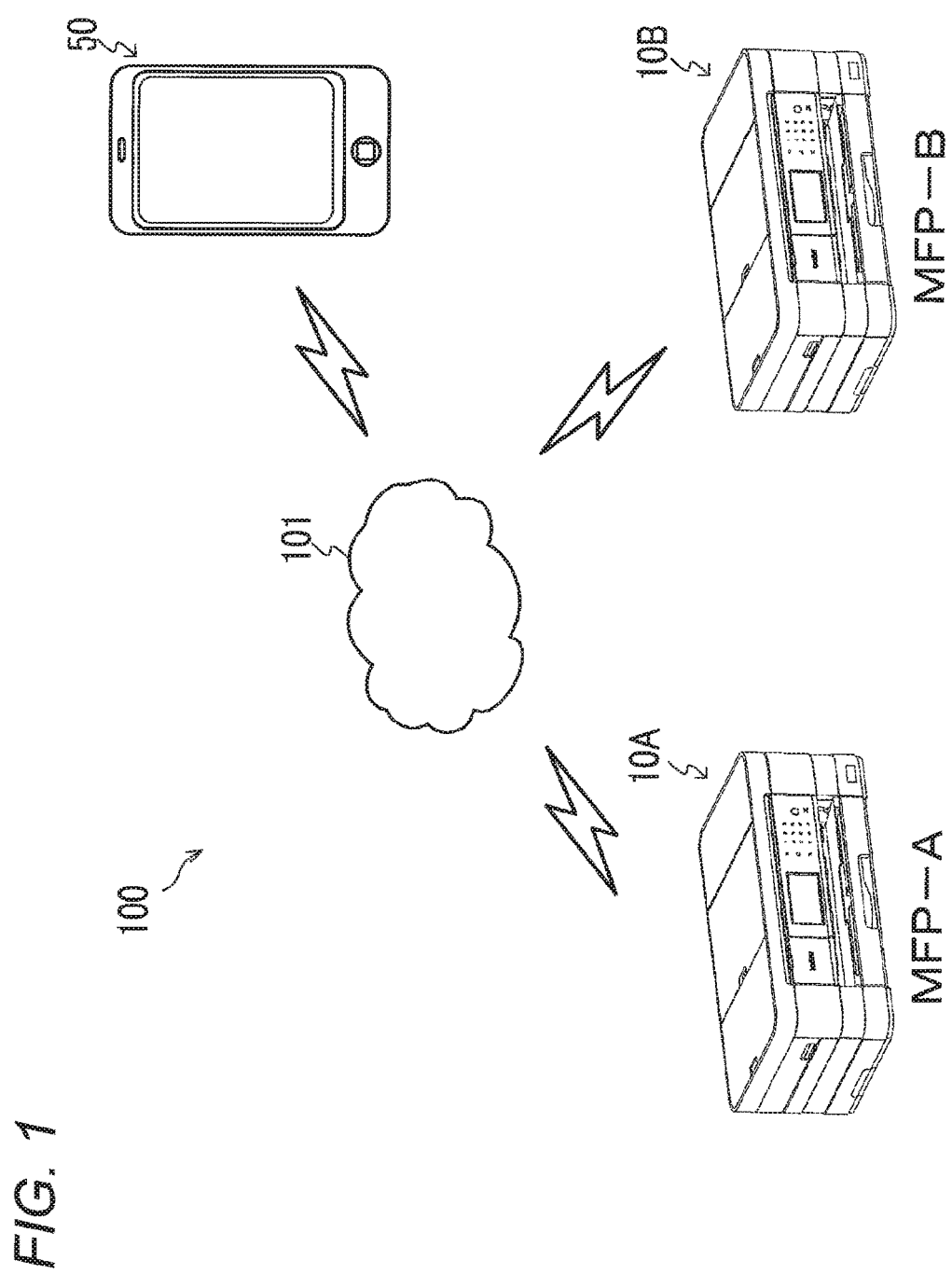
FIG. 1 is a view illustrating a schematic configuration of a recording system 100 according to an embodiment.

FIG. 1 is a view schematically illustrating a recording system 100 according to the present embodiment. The recording system 100 shown in FIG. 1 is composed of multi-function peripherals 10A and 10B (which hereinafter will also be referred to collectively as "MFPs 10") and a portable terminal 50. The MTPs 10 and the portable terminal 50 are electrically connected. The MFPs 10 and the portable terminal 50 may be connected via a communication network 101 such as a wired LAN or a wireless LAN, or may be connected by USB cables or the like. Also, a state where a plurality of devices is able to be communicated is an example of a state where the plurality of devices is electrically connected.

Figures 2A, 2B:
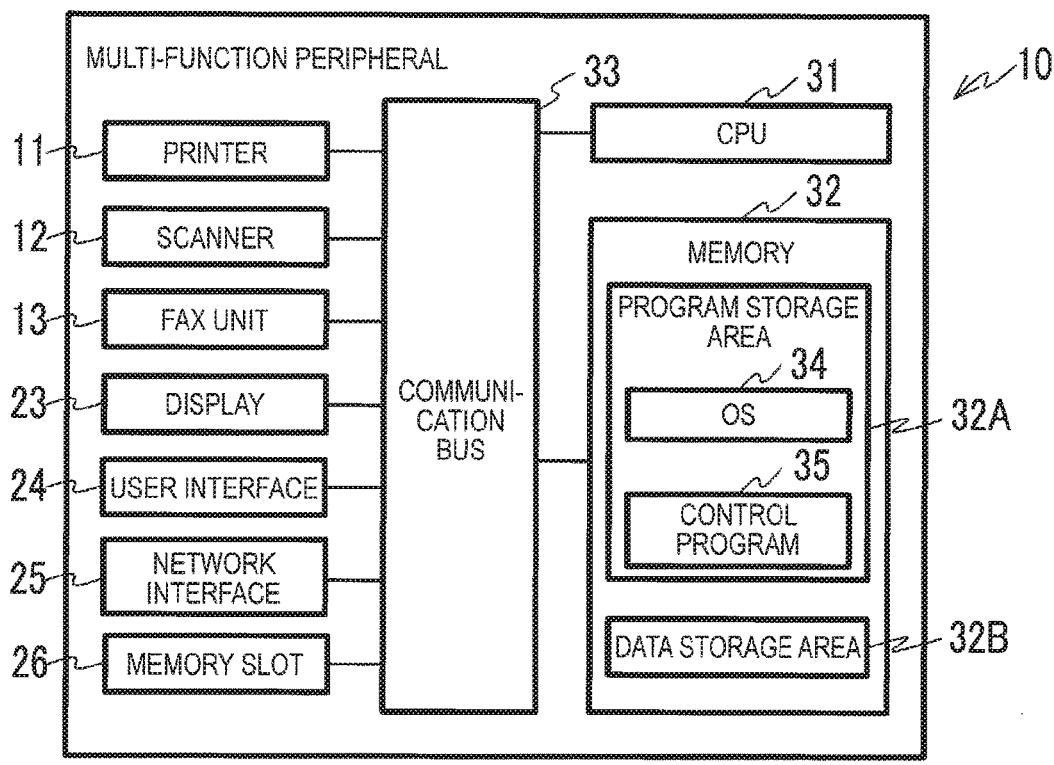
FIG. 2A is a block diagram of a MFP 10.
FIG. 2B is a block diagram of a portable terminal 50.

As shown in FIG. 2A, each MFP 10 mainly includes a printer 11, a scanner 12, a FAX unit 13, a display 23, a user interface 24, a network interface 25, a memory slot 26, a CPU 31, a memory 32, and a communication bus 33. Individual components constituting the MFP 10 are connected to one another via the communication bus 33. The MFPs 10 are examples of output devices.

The printer 11 performs a printing operation of recording images represented by image data on recording sheets. Recording sheets are examples of sheets or recording media. As the recording scheme of the printer 11, a known scheme such as an inkjet scheme or an electrophotographic scheme can be used. The scanner 12 performs a scanning operation of reading images recorded on documents and generating image data. The FAX unit 13 performs a FAX transmitting operation and a FAX receiving operation of transmitting or receiving image data in a scheme based on a FAX protocol.

The printing operation and the FAX transmitting operation from among the plurality of operations described above are examples of output operations of outputting contents represented by content data. However, operations performed by MFP 10 are not limited thereto. The MFP 10 may perform, an example of the output operations, a medium storage operation of storing content data acquired from the portable terminal 50 in a portable storage medium mounted to the memory slot 26. The MFP 10 may perform, as another example of the output operations, an operation of controlling the display 23 to display images represented by image data acquired from the portable terminal 50.

Operations which are is able to be performed between the MFPs 10A and 10B may be different. In the present embodiment, the MFP 10A is able to perform a printing operation and a FAX transmitting operation, and the MFP 10B is able to perform a printing operation, a FAX transmitting operation, and a medium storage operation. Also, an output device is not limited to a device which is able to perform a plurality of operations and may be able to perform only a single operation. In an MIB of each MFP 10, for example, a device ID identifying the corresponding MFP 10, and operation information representing operations, which is able to be performed by corresponding MFP 10, may be defined in advance. For example, the operation information may include operation IDs identifying the operations which are able to be performed. The operation IDs are examples of operation identification information.

The display 23 has a display screen for displaying a variety of information. An LCD, an OELD, or the like can be used as the display 23.

The user interface 24 receives user's operations for selecting objects displayed on the display screen of the display 23. Specifically, the user interface 24 has buttons, and outputs various operation signals associated with pushed buttons, to the CPU 31. Also, the user interface 24 may have a membranous touch sensor superimposed on the display screen of the display 23. That is, the display 23 may be configured as a touch panel display.

Meanwhile, the term "object" means an image which is selectable by operating the user interface 24 of the user. As an example, objects may be character strings displayed on the display 23, and when the user pushes direction keys of the user interface 24, one of the objects may be highlighted and then the user pushes a determination button of the user interface 24, the highlighted object may be selected. As another example, in a case where the user interface 24 is a touch panel, the objects may be icons, buttons, links, and the like displayed on the display 23, and an object displayed at a touched position may be selected.

The user interface 24 implemented as a touch panel receives user's operations touching the display screen of the display 23. Also, the user interface 24 outputs position information representing the touched positions on the display screen. As the upper left end of the display screen is the origin, and the right direction is the positive direction of the x axis, and the downward direction is the positive direction of the y axis, the position information can be expressed as coordinates (x, y) on an x-y plane. The touch panel can be used a known scheme such as an electrostatic capacitance scheme or a resistive film scheme.

Incidentally, in this specification, the term "touch" includes every operation by bringing inputting media into contact with the display screen. Touch examples are a tap operation by detaching a touched inputting medium from the display screen in a predetermined time, a long touch operation by stopping a touched inputting medium on the display screen, a slide operation by sliding a touched inputting medium on the display screen, a flick operation by sliding a touched inputting medium with acceleration equal to or higher than a threshold value, a pinch-in operation by sliding two inputting media touched at different locations on the display screen toward each other, a pinch-out operation by sliding two inputting media touched at different locations on the display screen away from each other, and the like.

Also, the term "touch" may include not only a case where an inputting medium is brought into contact with the display screen but also a case where an inputting medium is brought to a position close to the display screen. Further, the inputting media may be user's fingers, touch pens, etc. Hereinafter, an operation by taping the position of an icon displayed on the display 53 will be described as an example of an operation of selecting the corresponding icon.

The network interface 25 is an interface for performing communication with external devices via the communication network 101. That is, the MFP 10 outputs a variety of information to the portable terminal 50 via the network interface 25, and receives a variety of data or a variety of information from the portable terminal 50 via the network interface 25. A specific communication procedure of the network interface 25 is not limited. For example, Wi-Fi (a trademark of the Wi-Fi Alliance) can be used. Also, the MFP 10 may have an installation interface such as a USB cable, instead of the network interface 25.

The memory slot 26 is an interface which a portable storage medium can be mounted to or removed from. The CPU 31 can read out data or information from a portable storage medium mounted to the memory slot 26, or write data or information in a portable storage medium mounted to the memory slot 26. Although specific examples of a portable storage medium are not limited, and the portable storage medium may be a USB memory, a SD card, a CD-ROM, and a DVD-ROM.

The CPU 31 controls the operation of the whole MFP 10. On the basis of a variety of information which is output from the user interface 24, a variety of information acquired from external devices via the network interface 25, and the like, the CPU 31 acquires various programs (to be described below) from the memory 32 and executes those programs. That is, the CPU 31 and the memory 32 constitute an example of a controller.

The memory 32 has a program storage area 32A and a data storage area 32B. The program storage area 32A stores an OS 34 and a control program 35. Also, the control program 35 may be a single program, or may be an aggregate of a plurality of programs. The data storage area 32B stores data or information necessary for executing the control program 35.

Also, in this specification, the term "data" and the term "information" represents a bit or a bit string which can be handled by a computer. That is, the two term are in common in that view. However, when the computer handles "data," it is unnecessary for the computer to recognize the meanings of individual bits. In contrast, when the computer handles "information," an operation of the computer is diverged according to the meanings of individual bits. Also, a term "instruction" represents a control signal for prompting a device being a transmission destination to perform a subsequent operation. An instruction may include "information" or may have characteristics as "information".

Further, even when "data" or the "information" is changed in format (for example, a text format, a binary format, a flag format, and so on) for each computer, as long as it can be recognized that the meaning of the changed data or information is identical to the meaning of the original data or information, the changed data or information are handled as data or information identical to the original data or information. For example, information indicating "two" may be saved in one computer as an ASCII code "0x32" which is text format information, and may be saved in another computer as a binary number "10" which is binary format information.

However, the term "data" and the term "information" are not strictly distinguished and are permitted to be exceptionally handled. For example, data may be temporarily handled as information, and information may be temporarily handled as data. Further, while one thing is handled as data in one device, the one thing may be handled as information in another device. Furthermore, information may be taken out from among data, or data may be taken out from among information.

The memory 32 may be configured, for example, by a RAM, a ROM, an EEPROM, an HDD, a buffer included in the CPU 31, or a combination of them.

Also, the memory 32 may be a computer-readable storage medium. The computer-readable storage medium is a non-transitory medium. The computer-readable storage medium is a non-transitory medium. Examples of the non-transitory medium include not only the above described examples but also other recording media such as a CD-ROM and a DVD-ROM. Also, the non-transitory medium is also a tangible medium. Meanwhile, an electric signal which carries a program which is downloaded from a server or the like on the Internet is a computer-readable signal medium which is one type of computer-readable medium, but is not non-transitory computer-readable storage media.

The programs stored in the program storage area 32A are executed by the CPU 31. However, in this specification, sometimes, the operation of each program will be described without mentioning the CPU 31. That is, in the following description, a description "a program "A" performs a processing "A"" may mean that "the CPU 31 performs the processing "A" described in the program "A"". This meaning is common to the portable terminal 50 to be described below.

Also, the programs stored in the program storage area 32A determine events and operate according to the determination results. However, in this specification, the operation of each program will be described without describing the determination processing. In other words, in the following description, a description "the control program performs a processing "A" according to a condition "A"" may mean that "the control program determines whether the condition "A" is satisfied, and when it is determined that the condition "A" is satisfied, the control program performs the processing "A"".

Also, the programs stored in the program storage area 32A specify, acquire, extract, or select data or the like. A processing of specifying data or the like is, for example, a processing of specifying a data item according to a condition from among a plurality of data items, and storing the specified data item or an information item identifying the specified data item in a predetermined storage area. Information identifying data or the like is, for example, identification information identifying the data or the like, the index of an array where the data or the like is stored, or the pointer of a storage area where the data or the like is stored. This meaning is common to processing of a program for acquiring, extracting, or selecting data or the like.

An OS 34 is a basic program which provides an API for controlling the printer 11, the scanner 12, the FAX unit 13, the display 23, the user interface 24, the network interface 25, the memory slot 26, and so on which are hardware constituting the MIT 10. That is, each of the above described programs controls a corresponding piece of hardware by calling the API which is provided by the OS 34. However, in this specification, the operation of each program will be described without mentioning the OS 34. That is, in the following description, a description "a program "B" controls hardware "C"" may means that "the program "B" controls the hardware "C" via the API of the OS 34." This meaning is common to the portable terminal 50 to be described below.

As shown in FIG. 2B, the portable terminal 50 mainly includes a display 53, a user interface 54, a network interface 55, a CPU 61, a memory 62, and a communication bus 63. The display 53, the user interface 54, the network interface 55, the CPU 61, the memory 62, and the communication bus 63 which are included in the portable terminal 50 are similar to the display 23, the user interface 24, the network interface 25, the CPU 31, the memory 32, and the communication bus 33 which are included in the MFP 10, and thus repetitive descriptions thereof will not be made. The CPU 61 and the memory 62 is an example of a controller. Examples of the portable terminal 50 is a smart phone, a portable phone, and a tablet terminal.

In a program storage area 62A of the memory 62, an OS 64 as an example of activation source instructions, an output program 65 as an example of output instructions, and a map program 66 are stored. Also, a data storage area 62B of the memory 62 stores a variety of information shown in FIG. 3 is stored. Further, in the data storage area 62B, a content data folder for storing content data may be provided. Examples of content data is image data, photo data, document data, spreadsheet data, presentation data, video data, and music data.

As shown in FIGS. 7 to 12, the display 53 of the portable terminal 50 is divided into a common display area 80 and a program display area 81. In the common display area 80, regardless of the display content of the program display area 81, a status bar is displayed by the OS 64. In the status bar, a variety of information is displayed by the OS 64. In the status bar, for example, a back icon 82 to be described below, the title of a screen displayed on the program display area 81, an icon representing the remaining battery capacity of the portable terminal 50, an icon representing the communication state of the network interface 55, and an icon representing a push notification indicating that the portable terminal 50 receives a notification from an external service, and so on are displayed. In the program display area 81, a screen which is generated by a program which is executed in a foreground is displayed.

Hereinafter, a description "a program controls the display 53 to display a screen" means that a program screen is displayed in the program display area 81 and a status bar is displayed in the common display area 80. The program screen means a screen which is displayed in the program display area 81 in response to an instruction of the program. However, the display 53 may be switchable between a partial screen mode, in which the display area is divided into the common display area 80 and the program display area 81, and a full screen mode, in which the whole of the display area becomes the program display area 81.

Examples of the OS 64 include Android (a registered trademark of Google Inc.), iOS (a registered trademark of Cisco Systems, Inc.), Windows Phone (a registered trademark of Microsoft Corporation) operating system. The OS 64 can execute a plurality of programs installed in the portable terminal 50, in parallel. A plurality of programs can be virtually executed in parallel, for example, by a time division multiplex scheme. Also, when the OS 64 executes one of a plurality of programs being executed in the foreground and executes the other programs in a background.

The foreground is, for example, a state where a program screen according to execution of the corresponding program is displayed on most of the display area of the display 53. Most of the display area may refer to, for example, the program display area 81. The background is, for example, a state where a program screen according to execution of a program different from the corresponding program is displayed in most of the display area of the display 53. In other words, the portable terminal can control display 53 to display only program screens according to execution of a program which is executed in the foreground, from among a plurality of programs being executed in parallel.

Figure 13:
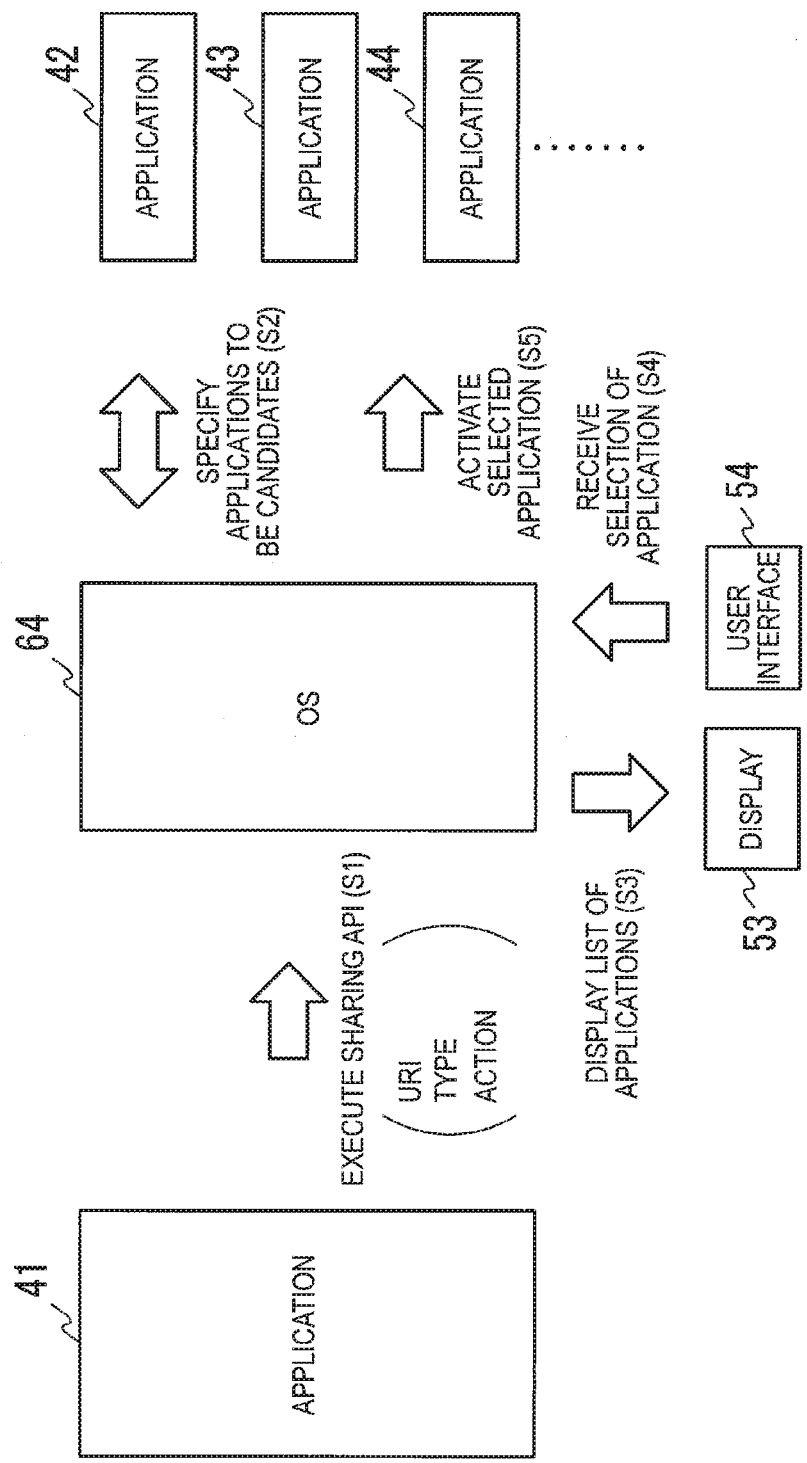
FIG. 13 is a view for explaining a sharing function which is implemented by a sharing API.

Also, the OS 64 provides a sharing function, by which activating a second program designated by a first program and transferring instructing information designated by the first program to the second program is performed, for the programs installed in the portable terminal 50. The first program can use the sharing function, for example, by executing an API which is provided by the OS 64 (hereinafter, referred to as the "sharing API"). More specifically, the first program uses the program ID and designation information of the second program as parameters, thereby executing the sharing API. With reference to FIG. 13, details of the sharing function will be described.

First, in STEP S1, a sharing source application 41 executes the sharing API of the OS 64 for implementing the sharing function. When the sharing API is executed, a URI, a type, and an action are obtained as parameters. The URI is information representing the address of sharing data. The type is information representing the data format of the sharing data. The action is information representing the type (such as browsing, editing, transmitting, or printing) of a processing which is to be performed by the sharing source application on the sharing data. The URI, the type, and the action are examples of instructing information which are transmitted from the sharing source application to a sharing destination application.

Meanwhile, applications 42, 43, 44, etc., which are candidates for a sharing source application preliminary declare the data formats of sharing data and the types of processing, which are executable by the applications 42, 43 and 44, for the OS 64. Therefore, the OS 64 specifies applications, from among the applications 42, 43 and 44, which is able to perform a processing represented by the action on sharing data having the data format represented by the type in STEP S2, and controls the display 53 to display a list of the specified applications, in STEP S3. Then, in STEP S4, the OS 64 stands by in a state where it can receive a user's operation of selecting one of the listed applications via the user interface 54.

Subsequently, when the OS 64 receives a user's operation of selecting one of the listed applications via the user interface 54 in STEP S4, in STEP S5, the OS activates the selected application using the URI, the type, and the action as parameters. In the following embodiment, the map program 66 corresponds to the application 41 of FIG. 13, and the output program 65 corresponds to one of the applications 42 to 44 of FIG. 13.

Also, the processing of STEPS S2 to S5 may be performed by a sharing source application. In this case, in STEP S2, the sharing source application acquires information specifying the applications being able to perform the processing represented by the action on sharing data having the data format represented by the type, from the OS 64. Subsequently, in STEP S5, the sharing source application executes the sharing API of the OS 64 to activate an application selected by a user's operation.

The output program 65 is a program for controlling a MFP 10 connected via the network interface 55 to perform an operation on content data. The output program 65 transmits information, such as recording instructing information for causing to perform a printing operation, scan instructing information for causing to perform a scanning operation, FAX instructing information for causing to perform a FAX transmitting operation, or storage instructing information for causing to perform a medium storage operation, to a MFP 10 via the network interface 55. Recording instructing information, scan instructing information, FAX instructing information, and medium storage instructing information are examples of output instructing information. Also, before transmitting the output instructing information, the output program 65 controls the display 53 to display a preview screen.

The map program 66 is a program for making a user designate an arbitrary area of a map image and transferring image data representing a map image of the designated area to the output program 65. The map program 66 is an example of an activation source program for receiving a user's operation of designating content data. Also, the activation source program is a program for designating designation information for identifying received content data, for the OS 64, and activating the output program 65 using the sharing function. Also, specific examples of the activation source program are not limited to the map program 66, and may include a paint program for editing images according to user's operations and transferring image data representing the edited images to the output program 65.

The data storage area 62B can store a device ID, and operation information corresponding to the device ID, as shown in FIG. 3A. Hereinafter, a record shown in FIG. 3A is also referred to as an operation information record. Also, the operation information record is not registered in advance when the output program 65 is installed, but is registered in a device selecting processing to be described below.

Device IDs are examples of device identification information identifying the MFPs 10A and 10B. In the present embodiment, the device ID of the MFP 10A is "MFP-A", and the device ID of the MFP 10B is "MFP-B". A MFP 10 which is identified by the device ID included in the operation information record is an example of a first device. Operation information is information representing operations which is able to be performed by a MFP 10 which is identified by a corresponding device ID, and is acquired from the MFP 10 which is identified by the corresponding device ID. In FIG. 3A, "PRINT" represents a printing operation, and "FAX TRANSMITTING" represents a FAX transmitting operation, as an example. In other words, in FIG. 3A, the MFP 10A is able to perform a printing operation and a FAX transmitting operation, as an example.

Also, the data storage area 62B stores a device update flag as shown in FIG. 3B. The device update flag is a flag representing whether the operation information record shown in FIG. 3A has been updated or not. In other words, in the device update flag, any one of "ON" representing that the operation information record has been updated and "OFF" representing that the operation information record has not been updated is set by the output program 65. The initial value of the device update flag is "OFF".

With reference to FIGS. 4 to 12, the operation of the recording system 100 according to the present embodiment will be described. The recording system 100 performs a processing of making a MFP 10 perform an output operation of content data designated by a user's operation on the portable terminal 50.

First, the OS 64 of the portable terminal 50 controls the display 53 to display a menu screen and displays a status bar in the common display area 80. FIG. 7A is an example of the menu screen. A menu screen shown in FIG. 7A includes a plurality of program icons 111, 112, 113, 114, and 115. The program icons 111 to 115 correspond to programs installed in the portable terminal 50. For example, the program icon 114 corresponds to the output program 65, and the program icon 115 corresponds to the map program 66. The OS 64 receives selection of any one of the program icons 111 to 115 via the user interface 54. When the OS 64 receives selection of the program icon 114 via the user interface 54, the OS 64 activates the output program 65. Selection of the program icon 114 is an example of a user's operation of instructing activation of the output program 65.

[Standard Activation Processing]

Figure 4:
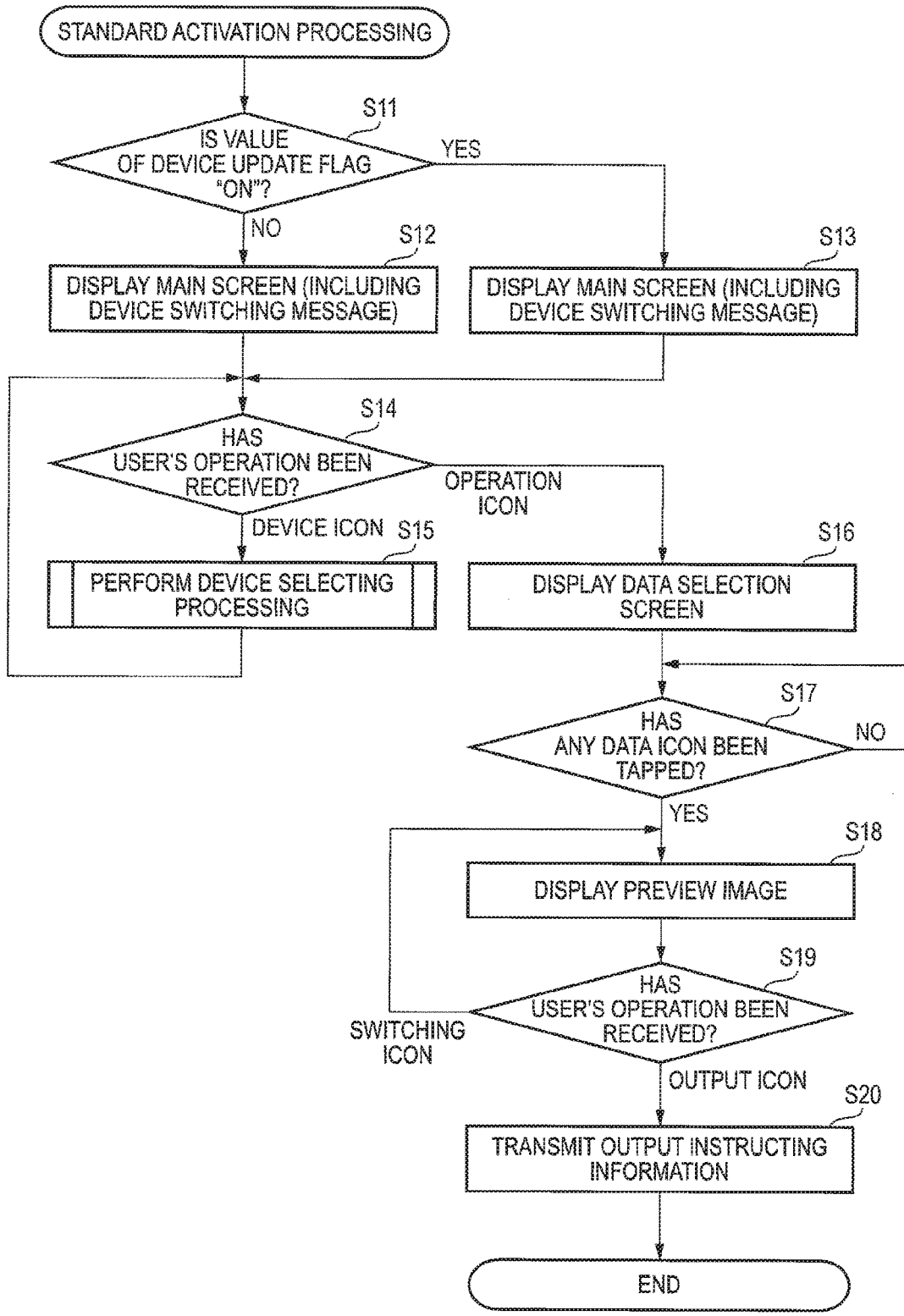
FIG. 4 is a flow chart of a standard activation processing.

When the OS 64 having received selection of the program icon 114 activates the output program 65 of the portable terminal 50, the output program performs a standard activation processing. In the standard activation processing, the output program 65 displays various screens for receiving user's operations of designating content data, an output operation, and an output device, and receives user's operations via the displayed screens. Hereinafter, content data designated by the user will be referred to as "designation data", and an output operation designated by the user will be referred to as a "designation operation", and an output device designated by the user will be referred to as a "designation device". In this case, the output program 65 makes the designation device perform the designation operation on the designation data. With reference to FIG. 4, details of the standard activation processing will be described.

First, in STEP S11, the output program 65 determines the value of the device update flag shown in FIG. 3B. When "OFF" has been set in the device update flag ("No" in STEP S11), in STEP S12, the output program 65 controls the display 53 to display a main screen shown in FIG. 7B. Meanwhile, when "ON" has been set in the device update flag ("Yes" in STEP S11), in STEP S13, the output program 65 controls the display 53 to display a main screen shown in FIG. 8A. Also, in STEP S13, the output program 65 sets "OFF" in the device update flag. The processing of STEPS S12 and S13 are examples of a first display processing. The main screen is an example of an operation selection screen.

The main screen shown in FIG. 7B includes a plurality of operation icons 116 and 117 and a device icon 119. The operation icons 116 and 117 are examples of operation designation objects corresponding to operations represented by operation information included in an operation information record. In other words, the operation icons 116 and 117 correspond to operations which is able to be performed by a MFP 10 identified by a device ID included in the operation information record. The device icon 119 is an example of a device switching object for causing the output program 65 to perform a processing of switching a designation device to another device. On the device icon 119, the device ID "MFP-A" identifying the MFP 10A, which is a designation device at that moment, is shown. Meanwhile, in a case where any operation information record has not been registered, on the device icon 119, a character string such as "UNSELECTED" may be displayed.

Figure 8A:
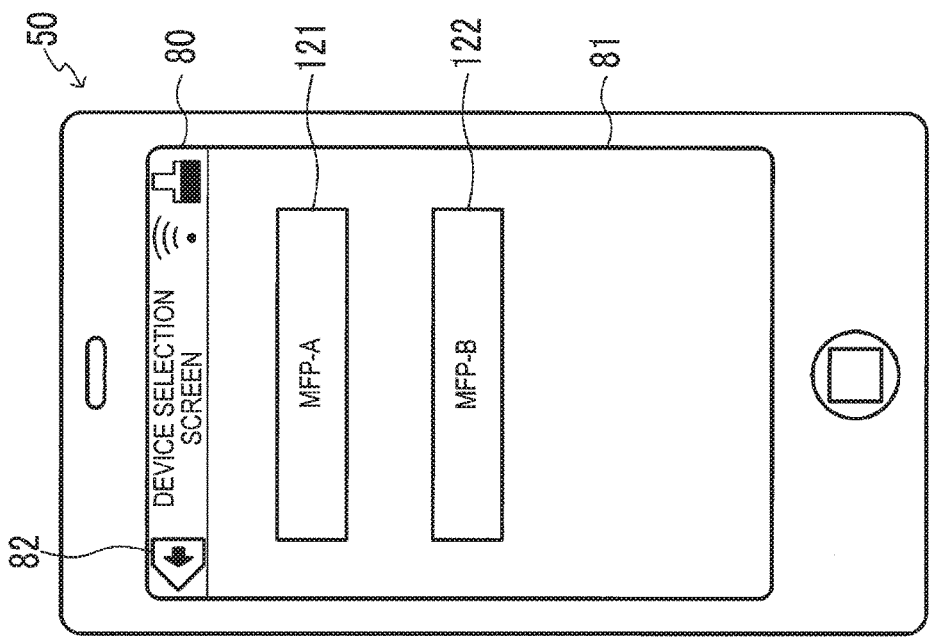

The main screen shown in FIG. 8A is displayed in a case where an operation information record including the device ID "MFP-B" and operation information "PRINT", "FAX TRANSMISSION", and "MEDIUM STORAGE" is stored in the data storage area 62B. In other words, the main screen shown in FIG. 8A includes operation icons 116 to 118 corresponding to the operation information "PRINT", "FAX TRANSMISSION", and "MEDIUM STORAGE", and a device icon 120 representing that a device having the device ID "MFP-B" has been a designated as a designation device. Also, the main screen shown in FIG. 8A includes a device switching message "MEDIUM STORAGE FUNCTION BECOMES USABLE.". Details of the device switching message will be described below.

Figure 6:
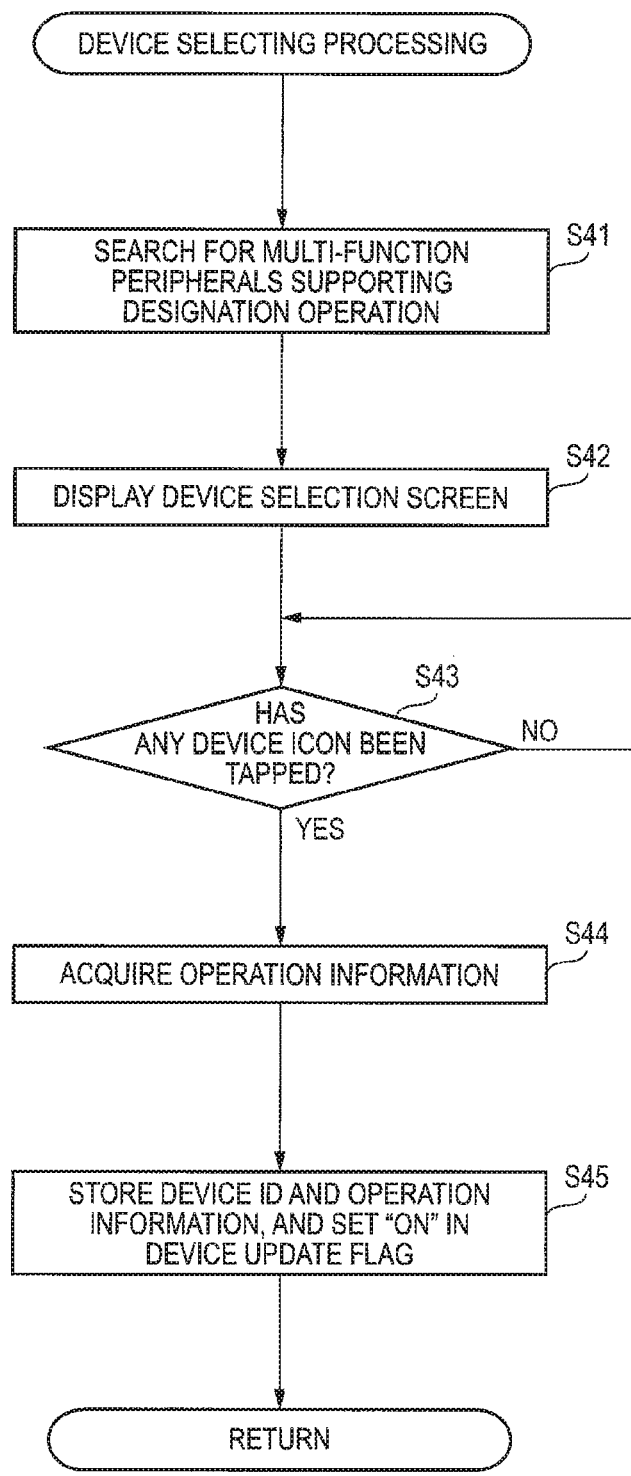
FIG. 6 is a flow chart of a device selecting processing.

Subsequently, in STEP S14, the output program 65 receives selection of an icon included in the main screen, via the user interface 54. The processing of STEP S14 is an example of a third receiving processing. For example, when selection of position of the device icon 119 is received via the user interface 54 ("DEVICE ICON" in STEP S14), in STEP S15, the output program 65 performs a device selecting processing. The device selecting processing is a processing of making the user select a designation device. Also, even in a case where the device icon 120 shown in FIG. 8A is selected, the same processing is performed. With reference to FIG. 6, details of the device selecting processing will be described.

First, in STEP S41, the output program 65 searches the plurality of MFPs 10 being able to be communicated via the network interface 55 among MFPs 10 being able to perform the designation operation. The output program 65 transmits a request for requesting transmission of device IDs and operation information stored in MIBs, to the MFPs 10 via the network interface 55, for example, using SNMP. Subsequently, the output program 65 receives the device IDs and the operation information as responses from the MFPs 10 via the network interface 55. Next, the output program 65 compares the operation ID of the designation operation with operation IDs included in the operation information received from the MFPs 10. Then, the output program 65 specifies MFPs 10 having operation information including the operation ID of the designation operation, as target MFPs. Meanwhile, at the stage of the device selecting processing of STEP S15, any designation operation has not been designated yet, the output program 65 specifies all of the MFPs 10A and 10B being able to be communicated via the network interface 55, as target MFPs. The processing of STEP S41 is an example of a specifying processing.

Additionally, operation information may be model information representing the models of the MFPs 10. In this case, the output program 65 accesses to correspondence information representing the correspondence relations between the model information and operation IDs corresponding to the model information, and acquires the operation IDs corresponding to the received model information. In other words, the correspondence information are also information representing operations which is able to be performed by the MFPs 10 of the models represented by the model information. Also, the correspondence information may be stored in the portable terminal 50 in advance, or may be stored in a cloud server (not shown).

Figure 8B:
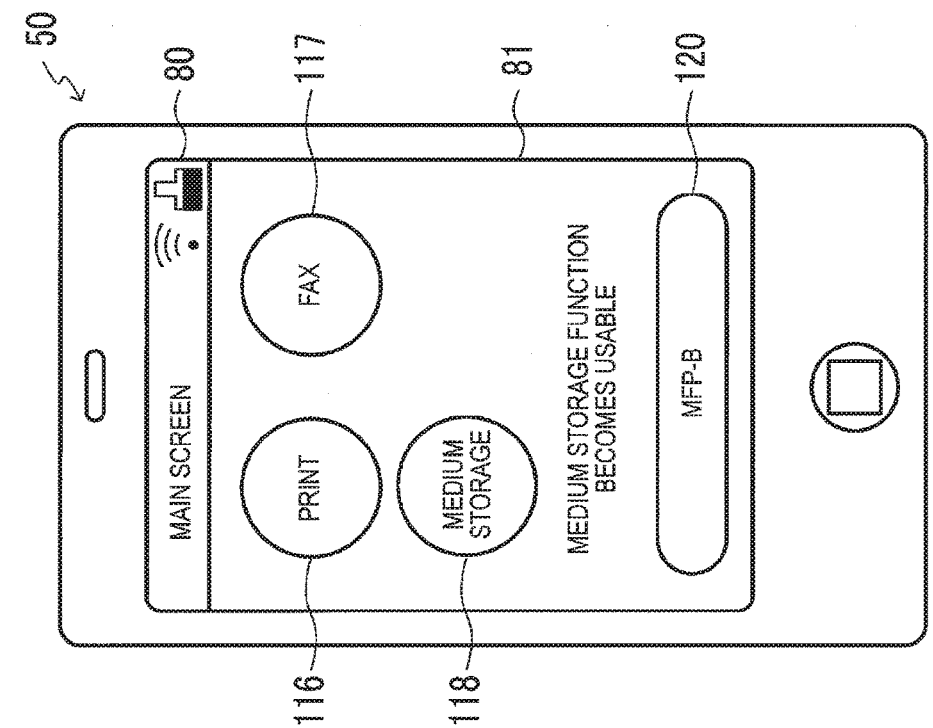

Subsequently, in STEP S42, the output program 65 controls the display 53 to display a device selection screen. FIG. 8B shows an example of the device selection screen. The device selection screen shown in FIG. 8B includes device icons 121 and 122. The device icons 121 and 122 correspond to the MFPs 10A and 10B which have been specified as target MFPs in STEP S41. Also, on the device icons 121 and 122, there are written the device IDs of the corresponding MFPs 10A and 10B. Subsequently, in STEP S43, the output program 65 receives selection of an icon included in the device selection screen, via the user interface 54. The processing of STEP S43 is an example of a second receiving processing.

For example, when selection of the device icon 122 is received via the user interface 54 ("Yes" in STEP S43), in STEP S44, the output program 65 receives the operation information of the MFP 10 corresponding to the selected device icon 122. The method receiving the operation information is the same as that in the processing of STEP S41. Meanwhile, in a case where the MIBs of the MFPs 10 is referred in STEP S41, the processing of STEP S44 can be omitted. The processing of receiving operation information of STEP S41 and S44 are examples of a second acquiring processing. The MFP 10 corresponding to the selected device icon is an example of a second device.

Subsequently, in STEP S45, the output program 65 stores an operation information record including the device ID "MFP-B" written on the selected device icon 122 and the operation information of the MFP 10B identified by the corresponding device ID (hereinafter, referred to as the "new operation information record"), in the data storage area 62B. Also, in a case where any operation information record is not stored in the data storage area 62B, the output program 65 newly stores the new operation information record in the data storage area 62B. This processing is an example of a storage control processing.

Meanwhile, in a case where an operation information record (hereinafter, referred to as an old operation information record) is stored in the data storage area 62B, the output program 65 compares the old operation information record and the new operation information record. When the old operation information record and the new operation information record are different, in STEP S45, the output program 65 overwrites the old operation information record with the new operation information record. This processing is an example of an updating processing. In other words, in a case where a MFP 10 different from the designation device is selected in the device selecting processing, the designation device is switched by the updating processing. Meanwhile, when the old operation information record is identical with the new operation information record, the output program 65 skips the processing of STEP S45.

Also, in STEP S45, the output program 65 sets "ON" in the device update flag and generates a device switching message. The device switching message is a message which is included in the main screen displayed in a case where the value of the device update flag is "ON". The device switching message is a message for notifying that the designation device has been switched. Specifically, the output program 65 specifies operations which are not represented by the operation information included in the old operation information record, from among the operations represented by the operation information included in the new operation information record. Then, the output program 65 generates a device switching message for notifying that execution of the specified operations becomes possible.

Alternatively, in STEP S45, the output program 65 may always overwrite an old operation information record with a new operation information record, without comparing the old operation information record and the new operation information record. Also, only in a case where the old operation information record and the new operation information record are different, the output program 65 may set "ON" in the device update flag and generate a device switching message.

For example, in a case where the device ID included in the old operation information record is "MFP-A" and the device ID included in the new operation information record is "MFP-B", as shown in FIG. 8A, a device switching message "MEDIUM STORAGE FUNCTION BECOMES USABLE." is generated. Then, the device switching message is included in the main screen in the first display processing, which is initially performed after the updating processing is performed. Alternatively, a device switching message may be generated in STEP S12. In this case, the output program 65 temporarily stores the old operation information record in STEP S45, and deletes the corresponding old operation information record in STEP S12.

Also, in the common display area 80 while the device selecting processing is being displayed in the program display area 81, the back icon 82 is also displayed. The back icon 82 is an example of a back object to switch to a previous screen, which is most-recently displayed on the display 53. The back icon 82 is not displayed when the menu screen or the main screen being the initial screen of the output program 65 is displayed in the program display area 81, and the back icon 82 is displayed when any other screen is displayed in the program display area 81. Alternatively, the back icon 82 may be displayed in the program display area 81, not in the common display area 80. Also, the output program 65 may make the back icon 82 display in the program display area 81.

Then, when selection of the back icon 82 displayed together with the device selection screen is received via the user interface 54, the OS 64 outputs notification information representing that the back icon 82 has been selected, to the output program 65. When the output program 65 receives the notification information output from the OS 64, the output program 65 skips the processing of STEPS S43 to S45 and controls the display 53 to display the main screen again. In other words, the main screen displayed on the display 53 immediately before the device selection screen was displayed is displayed again. In the present embodiment, on the assumption that the back icon 82 displayed together with the device selection screen shown in FIG. 8B has been selected and the main screen shown in FIG. 7B has been displayed, the following description will be described.

Referring to FIG. 4 again, when selection of one of the operation icons 116 and 117 is received via the user interface 54 ("OPERATION ICON" in STEP S14), the output program 65 temporarily stores an operation ID identifying an operation corresponding to the selected operation icon 116 or 117, and the device ID described on the device icon 119, in the data storage area 62B. The temporarily stored operation ID is a designation operation ID identifying the designation operation. The temporarily stored device ID is a designation device ID identifying the designation device. In the present embodiment, on the assumption that the operation ID of the printing operation has been temporarily stored as the designation operation ID, and the device ID "MFP-A" has been temporarily stored as the designation device ID, the following description will be described.

Subsequently, in STEP S16, the output program 65 controls the display 53 to display a data selection screen. Next, in STEP S17, the output program 65 receives selection of an icon included in the data selection screen, via the user interface 54. The processing of STEP S16 is an example of a second display processing, and the processing of STEP S17 is an example of a fourth receiving processing.

FIG. 9A shows an example of the data selection screen. A data selection screen shown in FIG. 9A includes a plurality of data icons 123, 124, and 125. The data icons 123 to 125 are examples of data objects corresponding to content data which can be designated as designation data. On the data icons 123 to 125, there are described the data IDs (such as file names) of corresponding content data. The content data corresponding to the data icons 123 to 125 may be stored in a content data folder in advance, or may be stored in a server (not shown) being able to be communicated via the network interface 55, in advance.

When the output program 65 receives selection of one of the data icons 123 to 125 via the user interface 54 ("Yes" in STEP S17), it temporarily stores content data corresponding to the selected data icon, as the designation data, in the data storage area 62B. Alternatively, the output program 65 may not store the designation data itself and may temporarily store information specifying the designation data (hereinafter, referred to as a "designation data ID"), in the data storage area 62B. The designation data ID may be, for example, information representing the storage location of the designation data, or may be a URL representing the designation data. In the present embodiment, on the assumption that the data icon 123 is selected, the following description will be continued. Meanwhile, when the output program 65 receives notification information representing that the back icon 82 displayed together with the data selection screen has been selected, from the OS 64, it controls the display 53 to display the main screen again.

When the output program 65 receives selection of the data icon 123 via the user interface 54 ("Yes" in STEP S17), in STEP S18, the output program controls the display 53 to display a preview screen. Subsequently, in STEP S19, the output program 65 receives selection of an icon included in the preview screen, via the user interface 54. The processing of STEP S18 is an example of a preview display processing, and the processing of STEP S19 is an example of the second receiving processing.

FIG. 9B shows an example of the preview screen. A preview screen shown in FIG. 9B includes a preview image 126, a print instructing icon 127, and a FAX switching icon 128. Meanwhile, the preview screen shown in FIG. 9B does not include any device switching icon to be described below. The preview image 126 is an image which will be obtained by outputting the designation data designated in STEP S17 by the designation operation designated in STEP S14. In other words, the preview image 126 which will be obtained by recording an image represented by image data identified by a file name "PHOTO.JPEG" on a recording sheet.

The print instructing icon 127 is an example of an output instructing object to designate the printing operation as the designation operation and corresponding to an instruction for making the designation device perform the printing operation of the designation data. The FAX switching icon 128 is an example of an operation switching object corresponding to an instruction for switching the designation operation from the printing operation to the FAX transmitting operation. In other words, the preview screen includes the output instructing object corresponding to the designation operation, and the operation switching object corresponding to the operation different from the designation operation, from among the plurality of operations represented by the operations of the operation information record. Meanwhile, in a case where the number of operations represented by the operation information included in the operation information record is one, a preview screen does not include any operation switching object.

When the output program 65 receives selection of the print instructing icon 127 via the user interface 54 ("OUTPUT ICON" in STEP S19), in STEP S20, the output program transmits print instructing information to the MFP 10A via the network interface 55. The print instructing information is an example of output instructing information for making the designation device perform the printing operation of the designation data. The print instructing information of the present embodiment includes image data which is identified by the file name "PHOTO.JPEG", and the designation operation ID identifying the output operation "PRINT". The output program 65 transmits the corresponding print instructing information to the MFP 10A which is the designation device, via the network interface 55. The processing of STEP S20 is an example of a third output instructing processing. Also, the print instructing information may not be the designation data itself and may include a designation data ID such as a URL.

Meanwhile, although not shown, the control program 35 of the MFP 10A receives the print instructing information from the portable terminal 50 via the network interface 25. Then, the control program 35 controls the printer 11 to perform the printing operation according to the received print instructing information. In other words, the printer 11 records the image represented by the content data "PHOTO.JPEG" included in the print instructing information, on a recording sheet.

Referring to FIG. 4 again, when the output program 65 receives selection of the FAX switching icon 128 included in the preview screen shown in FIG. 9B, via the user interface 54 ("SWITCHING ICON" in STEP S19), it switches the designation operation ID temporarily stored in the data storage area 62B, from the operation ID of the printing operation to the operation ID of the FAX transmitting operation. Also, in STEP S18, the output program 65 controls the display 53 to display the preview screen again. This processing is in common with the case where the switching icon has been selected in STEP S35 or S36, and thus details thereof will be described below. Thereafter, when the output program 65 receives notification information representing that the back icon 82 displayed together with the preview screen displayed in STEP S18 has been selected, from the OS 64, it controls the display 53 to display the data selection screen shown in FIG. 9A again.

Meanwhile, when the OS 64 receives selection of the program icon 115 included in the menu screen, via the user interface 54, the OS 64 activates the map program 66. When the OS 64 having received selection of the program icon 115 activates the map program 66 of the portable terminal 50, the map program controls the display 53 to display a map designation screen. FIG. 10A shows an example of the map designation screen. A map designation screen shown in FIG. 10A includes a map display area 129 and a "PREVIEW" icon. Then, the map program 66 receives user's operations on the map display area 129 and the "PREVIEW" icon via the user interface 54.

In the map display area 129, a part of a map image, which is can be displayed by map program 66, is displayed. When the map program 66 is activated, in the map display area 129, for example, a map image 130 including the current location of the portable terminal 50 acquired from a GPS is displayed. For example, the map program 66 acquires map image data representing the map image 130 which is a display object, from a server (not shown) via the network interface 55. Specifically, the map program 66 transmits a map image data request to the server via the network interface 55, and receives the map image data as a response from the server via the network interface 55.

Thereafter, when the map program 66 receives a user's operation on the position of the map display area 129 via the user interface 54, it changes the map image 130 to be displayed in the map display area 129. The map program 66 acquires map image data representing the changed map image 130 from the server. For example, the map image 130 which is displayed in the map display area 129 is slid in response to a slide operation, and is reduced in response to a pinch-in operation, and is enlarged in response to a pinch-out operation.

Also, when the map program 66 receives selection of the "PREVIEW" icon via the user interface 54, the map image data representing the map image 130 displayed on the map display area 129 is stored in the data storage area 62B. Further, the map program 66 designates designation information for the OS 64, and activates the output program 65 by using the sharing function. In other words, the map program 66 uses the program ID of the output program 65 and the data ID of the map image data as parameters, thereby executing the sharing API.

[External Activation Processing]

Figure 5:
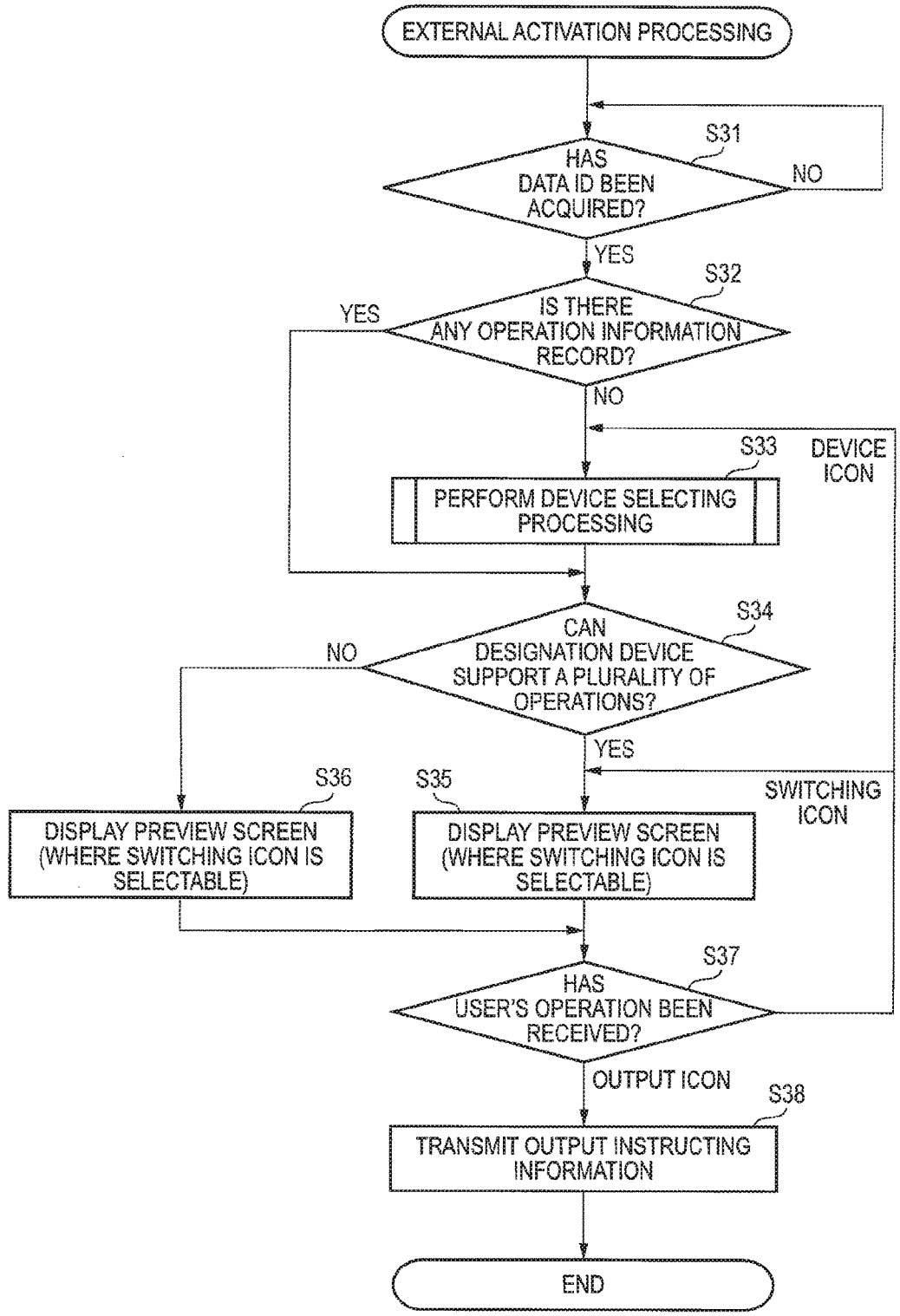
FIG. 5 is a flow chart of an external activation processing.

When the sharing API is executed, the OS 64 controls the map program 66 being executed in the foreground to finish or executes in the background and then activates the output program 65 and executes the output program in the foreground. When the output program 65 is activated by the map program 66 by using the sharing function, it performs an external activation processing. The external activation processing is a processing of making a designation device perform an output operation of designation data designated by the map program 66. With reference to FIG. 5, details of the external activation processing will be described.

First, the output program 65 acquires designation information output from the program activated by the output program 65 ("YES" in STEP S31). Specifically, the output program 65 executes an API for requesting designation information from the OS 64, thereby receiving designation information output from the OS 64, as a return value. Thereafter, the output program 65 temporarily stores a data ID included in the received designation information, as a designation data ID, in the data storage area 62B. Subsequently, in STEP S32, the output program 65 determines whether any operation information record is stored in the data storage area 62B. The processing of STEP S31 is an example of a first acquiring processing, and the processing of STEP S32 is an example of a second determining processing.

When it is determined that any operation information record is not stored in the data storage area 62B ("No" in STEP S32), in STEP S33, the output program 65 performs a device selecting processing. The processing of STEP S33 is the same as the processing of STEP S15, and thus repetitive descriptions will be omitted. As a result of STEP S33, an operation information record is registered in the data storage area 62B. In other words, in STEP S33, the output program 65 receives designation of a designation device. Meanwhile, when it is determined that an operation information record is stored in the data storage area 62B ("Yes" in STEP S32), the output program 65 skips the processing of STEP S33.

Subsequently, in STEP S34, the output program 65 determines whether the designation device is able to perform a plurality of output operations. In other words, in STEP S34, the output program 65 determines whether the operation information included in the operation information record shown in FIG. 3A represents a plurality of output operations. The processing of STEP S34 is an example of a first determining processing.

Figure 10B:
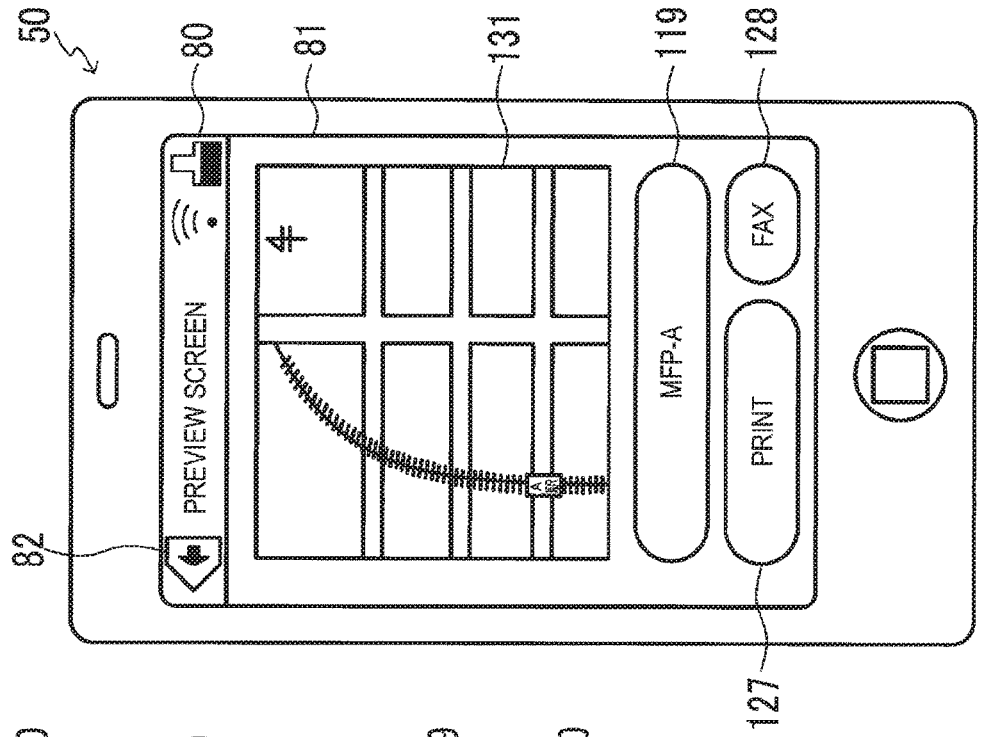
Figure 10A:
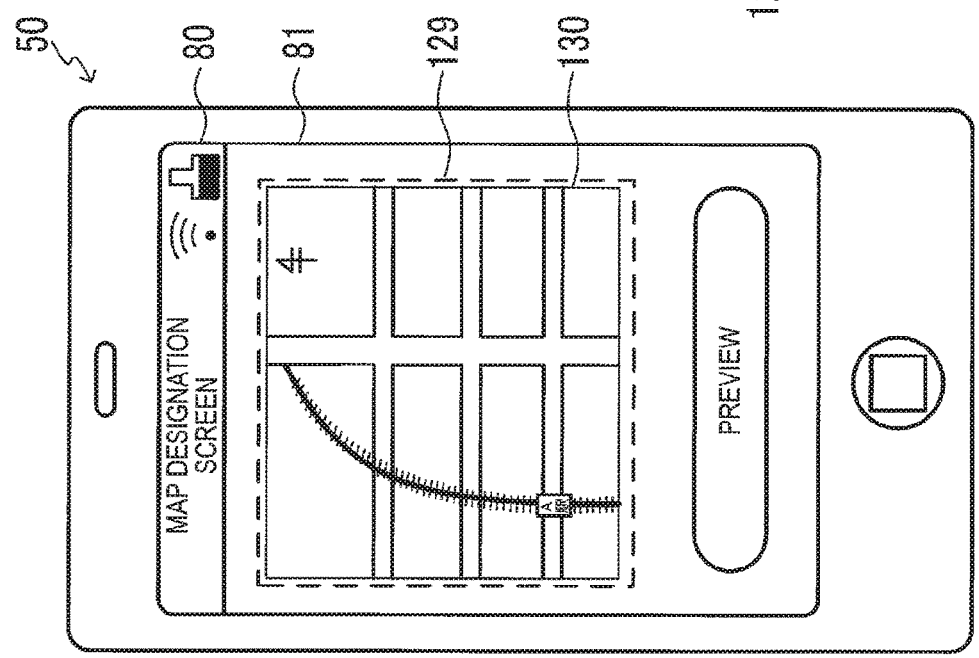

When it is determined that the designation device is able to perform a plurality of output operations ("Yes" in STEP S34), in STEP S35, the output program 65 controls the display 53 to display a preview screen shown in FIG. 10B. Meanwhile, when it is determined that the designation device is able to perform only one output operation ("No" in STEP S34), in STEP S36, the output program 65 controls the display 53 to display a preview screen shown in FIG. 11A. Subsequently, in STEP S37, the output program 65 receives selection of an icon included in the preview screen, via the user interface 54. The processing of STEPS S35 and S36 are examples of the preview display processing, and the processing of STEP S37 is an example of a first receiving processing.

The preview screen shown in FIG. 10B includes a first preview image 131, a device icon 119, a print instructing icon 127 which is an example of a first output instructing object, and a FAX switching icon 128 which is an example of a first operation switching object. The first preview image 131 is an example of a preview image outputted by the printing operation of the map image data identified by the data ID acquired in STEP S31. Meanwhile, the preview screen shown in FIG. 11A is different from the preview screen shown in FIG. 10B in that it does not include a FAX switching icon 128. A case where an operation switching object is not displayed is an example of a case where the corresponding operation switching object is not selectable. Also, the preview screen which is displayed in STEP S35 or S36 is different from the preview screen which is displayed in STEP S18 in that it includes a device icon 119 or 120.

The first preview image 131 is an example of a preview image obtained by outputting the map image data identified by the data ID acquired in STEP S31 by a printing operation which is a provisional designation operation. Additionally, the output program 65 designates one of the plurality of output operations included in the operation information record, as a provisional designation operation. For example, the provisional designation operation may be designated in the MIB of the MFP 10 or may be set in the output program 65 in advance. The output program 65 temporarily stores an operation ID identifying the provisional designation operation, as a designation operation ID, in the data storage area 62B. In other words, in a case where the provisional designation operation is a FAX transmitting operation, instead of the preview screen shown in FIG. 10B, a preview screen shown in FIG. 11B is displayed. From among the plurality of output operations represented by the operation information of the operation information record, the printing operation, which is the provisional designation operation, is an example of a first operation, and the FAX transmitting operation is an example of a second operation.

Subsequently, when the output program 65 receives selection of the print instructing icon 127 via the user interface 54 ("OUTPUT ICON" in STEP S37), in STEP S38, it transmits print instructing information which is an example of the output instructing information, to the MFP 10A which is the designation device, via the network interface 55. The printing operation corresponding to the selected print instructing icon 127 is an example of a target operation. The processing of STEP S38 to transmit the print instructing information is the same as the processing of STEP S20 described already, and thus repetitive descriptions will be omitted. The processing of STEP S38 performed in response to that the print instructing icon 127 shown in FIG. 10B is selected is an example of a first output instructing processing. The processing of STEP S38 performed in response to that the print instructing icon 127 shown in FIG. 11A is selected is an example of a second output instructing processing.

Meanwhile, when the output program 65 receives selection of the FAX switching icon 128 via the user interface 54 ("SWITCHING ICON" in STEP S37), the output program 65 switches the designation operation ID temporarily stored in the data storage area 62B, from the operation ID of the printing operation to the operation ID of the FAX transmitting operation. Further, in STEP S35, the output program 65 performs a preview display processing of controlling the display 53 again to display the preview screen shown in FIG. 11B. The preview screen shown in FIG. 11B is an example of a preview image including a second preview image 132, a device icon 119, a FAX instructing icon 133, and a print switching icon 134.

The second preview image 132 is an image which is faxed the map image 130 represented by the map image data to a device and is recorded on a recording sheet by the device receiving the fax. The second preview image 132 is different from the first preview image 131, for example, in that it includes a FAX header. For example, the FAX header includes a name representing the FAX transmission source, and a FAX transmission time. The FAX instructing icon 133 is an example of a second output instructing object to designate the FAX transmitting operation as a designation operation and corresponding to an instruction for making the designation device perform the FAX transmitting operation of the designation data. The print switching icon 134 is an example of a second operation switching object corresponding to an instruction for switching the provisional designation operation from the FAX transmitting operation to the printing operation.

When the output program 65 receives selection of the print switching icon 134 via the user interface 54 ("SWITCHING ICON" in STEP S37), it switches the designation operation ID temporarily stored in the data storage area 62B, from the operation ID of the FAX transmitting operation to the operation ID of the printing operation. Further, in STEP S35, the output program 65 controls the display 53 to display the preview screen shown in FIG. 10A again. Also, when the output program 65 receives selection of the FAX instructing icon 133 via the user interface 54 ("OUTPUT ICON" in STEP S37), in STEP S38, the output program transmits FAX instructing information to the MFP 10A which is the designation device, via the network interface 55. The FAX instructing information is an example of output instructing information for making the designation device perform the FAX transmitting operation of the designation data.

The FAX instructing information of the present embodiment includes the map image data being the designation data, the designation operation ID identifying the FAX transmitting operation being the designation operation, and designation information (such as a phone number) specifying an external device being the FAX transmission destination. Then, although not shown, the control program 35 receives the FAX instructing information from the portable terminal via the network interface 25. The control program 35 controls the FAX unit 13 to perform the FAX transmitting operation according to the received FAX instructing information. In other words, the FAX unit 13 faxes the map image data included as content data in the FAX instructing information, to the external device specified by the designation information.

Also, for example, when the output program 65 receives selection of the device icon 119 of the preview screen shown in FIG. 10B ("DEVICE ICON" in STEP S37), in STEP S34, the output program performs the device selecting processing shown in FIG. 6. Further, in STEP S41, the output program 65 specifies MFPs 10 being able to perform the output operation specified by the designation operation ID, from among the plurality of MFPs 10 being able to be communicated via the network interface 55. The other processing have been already described, and thus repetitive descriptions will be omitted.

Figure 12:
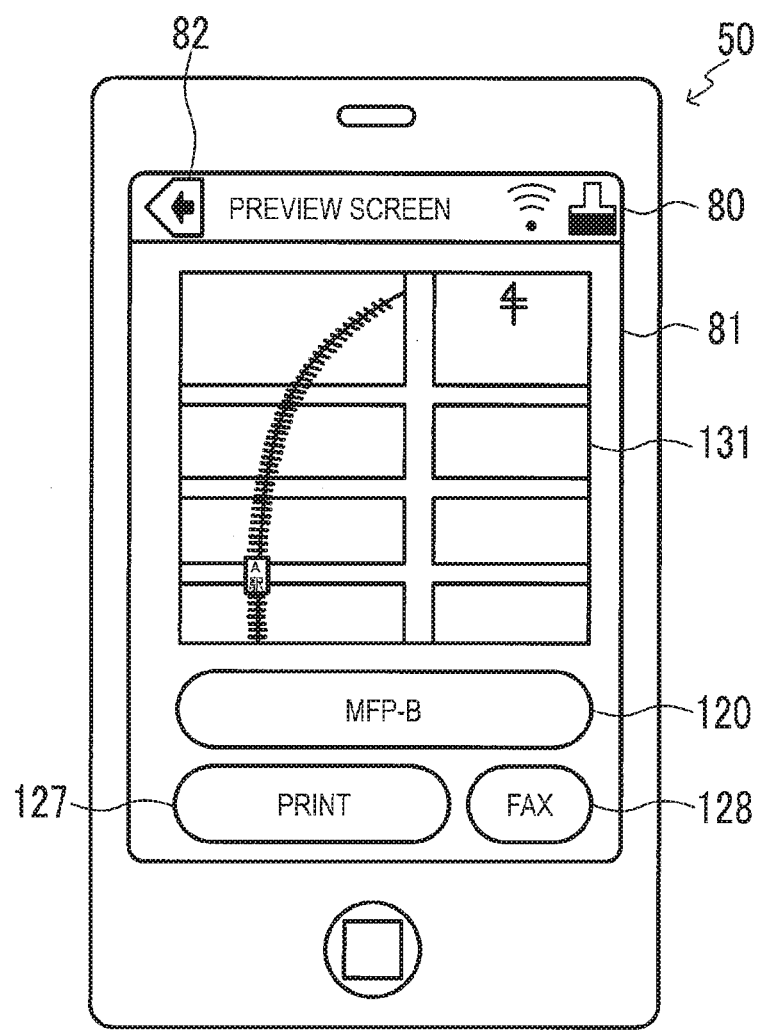
FIG. 12 shows a display example of a preview screen which is displayed when a device switching icon 119 of FIG. 10B is selected.

Also, for example, when the output program 65 receives selection of the device icon 122 included in the device selection screen shown in FIG. 8B, via the user interface 54, the output program switches the designation device ID temporarily stored in the data storage area 62B, from the device ID "MFP-A" of the MFP 10A to the device ID "MFP-B" of the MFP 10B. Further, in STEP S35, the output program 65 controls the display 53 to display a preview screen shown in FIG. 12. The preview screen shown in FIG. 12 is different from the preview screen shown in FIG. 10B in that it includes the device icon 120 instead of the device icon 119.

Moreover, when the back icon 82 displayed together with the preview screen shown in FIG. 10B, 11A, 11B, or 12 is selected, the map program 66 is executed again in the foreground. In other words, the OS 64 control the output program 65, which is being executed in the foreground, to be executed in the background and executes the map program 66 in the foreground. Further, the map program 66 executed in the foreground displays the map designation screen shown in FIG. 10A, on the display 53.

[Effects of Present Embodiment]

According to the above described embodiment, in a preview screen which is displayed in a case where a designation device is able to perform a plurality of output operations, both of an output instructing icon and an operation switching icon are displayed. Therefore, content data is output by a target operation designated from among the plurality of output operations by the user. In other words, it is possible to instruct a designation device being able to perform a plurality of output operations to perform any one of the plurality of output operations. Meanwhile, in a preview screen which is displayed in a case where a designation device is able to perform only one output operation, an output instructing icon for performance of the corresponding output operation is displayed, but any operation switching icon is not displayed. Therefore, it is possible to make the user recognize that the designation device is able to perform only one output operation.

Also, in the above described embodiment, an example in which any operation switching object is not displayed in the preview screen shown in FIG. 11A has been described. However, the method of making it impossible to select an operation switching object is not limited thereto. For example, the operation switching object may be grayed out. In this case, even if the output program 65 receives selection of the operation switching object grayed out, via the user interface 54, the output program will not perform the device selecting processing. Also, in the case where the designation device is able to perform only one output operation, the output program 65 may make the designation device perform the corresponding output operation without performing the preview display processing.

Also, according to the above described embodiment, before making a MFP 10 output designation data, the output program controls the display 53 to display a preview screen, whereby it is possible to make user confirm an output result image. As a result, it becomes easy to obtain a desired output result desired by the user. In other words, it is possible to suppress the processing from being re-performed due to an output result different from a user's intention.

Also, according to the above described embodiment, it is possible to receive designation of a MFP 10 to perform a designation operation via the device icon 119 or 120. Here, a screen transition from a preview screen to the main screen by the back icon 82 is possible in the standard activation processing, but is not impossible in the external activation processing. For this reason, the device icon 119 or 120 needs only to be included in the main screen of the standard activation processing and a preview screen of the external activation processing. Meanwhile, a preview screen of the standard activation processing does not necessarily need to include the device icon 119 or 120.

Further, according to the above described embodiment, when the operation information record is updated, a device switching message is displayed in a main screen which is subsequently displayed. Therefore, it is possible to make the user recognize the update of the designation device. Also, operations which is able to be performed may differ depending on the MFPs 10, and in this case, the user can recognize that operations become usable or unusable, by switching of the designation device.

Also, in the device selecting processing which is performed in STEP S33, the processing of STEP S45 may be omitted. In other words, designation of a MFP 10 in STEP S33 may be used only in output instructing information transmission of STEP S38 which is performed immediately after STEP S33, and it may be unnecessary to store an operation information record including the device ID and operation information of the corresponding MFP 10 in the data storage area 62B.

Also, in the portable terminal 50 of the above described embodiment, various programs stored in the program storage area 62A of the memory 62 are executed by the CPU 61, whereby individual processing to be performed by the controller of this disclosure are implemented. However, the configuration of the controller is limited thereto, and the whole or a part of the controller may be implemented by hardware such as an IC and the like.

Further, this disclosure can be implemented as the portable terminal 50 and can also be implemented as a program making the portable terminal 50 perform the processing. Furthermore, the corresponding program may be recorded in non-transitory recording media to be provided. The non-transitory recording media may include not only CD-ROMs and DVD-ROMs but also a memory mounted on a server which can be connected to the portable terminal 50 via the communication network 101. Further, the program stored in the memory of the server may be distributed as information or a signal representing the corresponding program, via the communication network 101 such as the Internet.

What is claimed is:

1. A non-transitory computer-readable medium storing output instructions to control a portable terminal including a user interface, a memory, a display, and a network interface, the network interface being configured to be electrically connected to a plurality of output devices, the memory being configured to store activation source instructions that are able to cause the portable terminal to activate the output instructions and to perform a processing of notifying the output instructions of data identification information identifying content data, the output instructions and the activation source instructions being executable by a processor, the output instructions being able to cause the portable terminal to function as an application capable of performing standard activation operations and external activation operations, the external activation operations being activated by the activation source instructions, wherein the application supports the plurality of output functions, and the plurality of output devices includes a multiple function device being able to perform at least two of the plurality of output functions and a single function device being able to perform only one of the plurality of output functions, the standard activation operations comprising:

performing, in response to receiving a selection of an output device via the user interface, a storage control processing of storing device identification information, which corresponds to the selected output device, identifying the selected output device, in the memory, as a designated output device; and performing, in response to receiving a selection of the content data via the user interface, setting the selected content data as an output-target content data;

performing selecting output processing including;
   a display processing of displaying a plurality of images, each of which corresponds to each of the plurality of output functions on the display;
   a first receiving processing of receiving an operation of designating one image of the plurality of images via the user interface, the designated one image corresponding to a target function corresponding to the designated one image of the plurality of images;
   a first output instructing processing of transmitting output instructing information to the default device via the network interface so that the output-target content data is output by the target function; and
the external activation operations comprising:
performing, a first acquiring processing of acquiring the data identification information output from the activation source instructions, the content data identified by the data identification information being set as an output-target content data;
performing a second acquiring processing of acquiring operation information representing output functions, which is able to be performed by the designated output device, which is identified by the device identification information stored in the storage control processing of the standard activation operations;
performing a first determining processing of determining whether the designated output device is the multiple function device being able to perform at least two of the plurality of output functions or the single function device being able to perform the only one output function;
performing, when it is determined in the first determining processing that the designated output device is the multiple function device being able to perform at least two of the plurality of output functions, the selecting output processing; and
performing, when it is determined in the first determining processing that the designated output device is the single function device being able to perform the only one output function, a non-selecting output processing of transmitting the output instructing information to the designated output device via the network interface so that the output-target content data is output by the only one output function, without displaying of images for designating the target function and without receiving an operation for designating the target function.

2. The non-transitory computer-readable medium according to claim 1,
   wherein the output functions include a first operation, and a second operation different from the first operation,
   wherein the output instructions cause the portable terminal to perform operations comprising:
   performing a preview display processing of controlling the display to display a preview screen including: a preview image, which will be obtained by outputting the content data by the target function; an output instructing object to designate the target function; and an operation switching object to switch the target function;
   receiving, in the first receiving processing, a user operation of selecting an object included in the preview screen, via the user interface;
   controlling, in the preview display processing in a case where it is determined in the first determining processing that the operation information represents the multiple function device, controlling the display to display the preview screen including a first preview image, a first output instructing object, and a first operation switching object, wherein the first preview image is a preview image which will be obtained by outputting the content data by the first operation, the first output instructing object is an output instructing object to designate the first operation as the target function, and the first operation switching object is an operation switching object to switch from the first operation to the second operation;
   performing, in response to selection of the first output instructing object in the first receiving processing, the first output instructing processing; and
   performing, in response to selection of the first operation switching object in the first receiving processing, the preview display processing of controlling the display to display a preview screen including a second preview image, a second output instructing object, and a second operation switching object, wherein the second preview image is a preview image which will be obtained by outputting the content data by the second operation, the second output instructing object is an output instructing object to designate the second operation as the target function, and the second operation switching object is an operation switching object to switch from the second operation to the first operation.

3. The non-transitory computer-readable medium according to claim 2,
   wherein the output instructions cause the portable terminal to perform operations comprising:
   performing, when it is determined in the first determining processing that the operation information represents the single function device, the preview display processing of controlling the display to display a preview screen in which it is not able to select the operation switching object.

4. The non-transitory computer-readable medium according to claim 2,
   wherein the device identification information identifies a first device which is one of the plurality of output devices,
   wherein the output instructions cause the portable terminal to perform operations comprising:
   controlling, in the preview display processing, the display to display the preview screen further including a device switching object, wherein the device switching object is an object to switch the output device that is controlled to perform the output function, and
   performing, in response to selection of the device switching object in the first receiving processing,
      a specifying processing of specifying output devices being able to perform the first operation from among the plurality of output devices being able to be communicated via the network interface;
      a second receiving processing of receiving a user operation of designating a second device which is one of the output devices specified in the specifying processing, via the user interface; and
      the second acquiring processing and the first determining processing for the second device.

5. The non-transitory computer-readable medium according to claim 4,
   wherein the output instructions cause the portable terminal to perform operations comprising:
   controlling, in the preview display processing in a case where the output instructions are activated by the activation source instructions, the display to display the preview screen further including the device switching object;

performing, when an operating system of the portable terminal receives a user operation to activate and the output instructions are activated by the operating system, a first display processing of controlling the display to display an operation selection screen, the operation selection screen including an operation designation object, which is corresponding to output functions being able to be performed by the first device, and the device switching object;

performing a third receiving processing of receiving a user operation of selecting an object included in the operation selection screen, via the user interface; and performing, in response to selection of an operation designation object in the third receiving processing, a second display processing of controlling the display to display a data selection screen, the data selection screen including a plurality of data objects corresponding to the content data, respectively; and performing, a fourth receiving processing of receiving a user operation of selecting an object included in the data selection screen, via the user interface;

performing, in response to selection of a data object in the fourth receiving processing, the preview display processing of controlling the display to display a preview screen which does not include the device switching object; and performing, in response to selection of an output instructing object in the first receiving processing, a third output instructing processing of transmitting the output instructing information to the first device via the network interface, wherein the output instructing information of the third output instructing processing is information for outputting the content data designated in the fourth receiving processing by the output function designated in the third receiving processing.

6. The non-transitory computer-readable medium according to claim 5,
wherein a back object is displayed together with the preview screen on the display, and the back object is an object to switch from the preview screen to a previous screen, and the previous screen is a screen displayed on the display immediately before the preview screen is displayed on the display, and in response to selection of the back object via the user interface in a case where the output instructions are activated by the operating system, the display displays the data selection screen as the previous screen; and in response to selection of the back object via the user interface in a case where the output instructions are activated by the activation source instructions, the activation source instructions is executed in a foreground instead of the output instructions, wherein the foreground is in a state where a screen according to execution of the activation source instructions is displayed in a display area of the display, wherein the activation source instructions executed in the foreground displays a screen displayed immediately before activation of the output instructions, as the previous screen.

7. The non-transitory computer-readable medium according to claim 5,
wherein the output instructions cause the portable terminal to perform operations comprising:

performing, in response to performance of the second receiving processing, the output instructions makes the portable terminal perform an updating processing of updating the device identification information stored in the memory, with device identification information identifying the second device, and performing, in the first display processing that is initially performed after the updating processing is performed, a notification that the device identification information stored in the memory has been updated.

8. The non-transitory computer-readable medium according to claim 4,
wherein the output instructions cause the portable terminal to perform operations comprising:

performing a second determining processing of determining whether the device identification information is stored in the memory;

performing, when the first acquiring processing is performed and it is determined in the second determining processing that the device identification information is stored, the second acquiring processing and the first determining processing; and performing, when the first acquiring processing is performed, and it is determined in the second determining processing that the device identification information is not stored, the specifying processing and the first receiving processing.

9. The non-transitory computer-readable medium according to claim 1,
wherein the memory stores type information representing the type of the content data, corresponding to one or more output functions, in advance, and wherein the output instructions causes the portable terminal to perform operations comprising:

determining, in the first determining processing, whether the plurality of output functions represented by the operation information corresponds to the type information of the content data identified by the data identification information.

10. A portable terminal including a user interface, a memory, a network interface, and a controller, wherein the network interface is configured to be electrically connected to a plurality of output devices, wherein the memory is configured to store output instructions and an activation source instructions, wherein the controller executing the activation source instructions is configured to activate the output instructions and notify the output instructions of data identification information identifying the content data, wherein the controller executing the output instructions is configured to cause the portable terminal to function as an application capable of performing standard activation operations and external activation operations, the external activation operations being activated by the activation source instructions, wherein the application supports the plurality of output function, and the plurality of output devices includes a multiple function device being able to perform at least two of the plurality of output functions and a single function device being able to perform only one of the plurality of output functions, the standard activation operations comprising:

performing, in response to receiving a selection of an output device via the user interface, a storage control processing of storing device identification information, which corresponds to the selected output device, identifying the selected output device, in the memory, as a designated output device;

performing, in response to receiving a selection of the content data via the user interface, setting the selected content data as an output-target content data;

performing selecting output processing including;
- a display processing of displaying a plurality of images, each of which corresponds to each of the plurality of output functions on the display;
- a first receiving processing of receiving an operation of designating one image of the plurality of images via the user interface, the designated one image corresponding to a target function corresponding to the designated one image of the plurality of images;
- a first output instructing processing of transmitting output instructing information to the default device via the network interface so that the output-target content data is output by the target function; and the external activation operations comprising:

performing a first acquiring processing of acquiring the data identification information output from the activation source instructions, the content data identified by the data identification information being set as an output-target content data;

performing a second acquiring processing of acquiring operation information representing output functions, which are able to be performed by the designated output device, which is identified by the device identification information stored in the storage control processing of the standard activation operations;

performing a first determining processing of determining whether the designated output device is the multiple function device being able to perform at least two of the plurality of output functions or the single function device being able to perform the only one output function, performing, when it is determined in the first determining processing that the designated output device is the multiple function device being able to perform at least two of the plurality of output functions, the selecting output processing, and performing, when it is determined in the first determining processing that the designated output device is the single function device being able to perform the only one output function, a non-selecting processing of transmitting the output instructing information to the designated output device via the network interface so that the output-target content data is output by the only one output function, without displaying of images for designating the target function and without receiving an operation for designating the target function.

11. The non-transitory computer-readable medium according to claim 1,
wherein the multiple function device includes a first output interface and a second output interface,
wherein a first output function of the at least two of the plurality of output functions includes uses the first output interface, and
wherein a second output function, which is different from the first output function, of the at least two of the plurality of output functions uses the second output interface.

12. The non-transitory computer-readable medium according to claim 11,
wherein the first output interface is a printer, and
wherein the second output interface is a facsimile unit.

* * * * *